(12) United States Patent
Kumar et al.

(10) Patent No.: US 7,701,341 B2
(45) Date of Patent: Apr. 20, 2010

(54) DEVICE SERVICE PROVIDER INTERFACE

(75) Inventors: Anush Kumar, Seattle, WA (US); Mohamed Fakrudeen Ahmed, Coimbatore (IN); Janaki Ram Goteti, Hyderabad (IN); Vamshidhar G. R. Reddy, Redmond, WA (US); Vinod Anantharaman, Issaquah, WA (US); Balasubramanian Sriram, Sammamish, WA (US); Abhishek Agarwal, Hyderabad (IN)

(73) Assignee: Microsoft Corporation, Redmond, WA (US)

( * ) Notice: Subject to any disclaimer, the term of this patent is extended or adjusted under 35 U.S.C. 154(b) by 1463 days.

(21) Appl. No.: 11/061,337

(22) Filed: Feb. 18, 2005

(65) Prior Publication Data

US 2006/0053234 A1    Mar. 9, 2006

Related U.S. Application Data

(60) Provisional application No. 60/606,281, filed on Sep. 1, 2004, provisional application No. 60/606,577, filed on Sep. 2, 2004.

(51) Int. Cl.
*G08B 13/14* (2006.01)
(52) U.S. Cl. .................... 340/572.1; 235/375
(58) Field of Classification Search ............. 340/572.1, 340/10.1, 10.5, 10.52, 568.1; 235/375; 700/221; 709/250
See application file for complete search history.

(56) References Cited

U.S. PATENT DOCUMENTS

| 5,650,768 | A  | 7/1997  | Eswaran     |
|-----------|----|---------|-------------|
| 5,910,776 | A  | 6/1999  | Black       |
| 6,405,261 | B1 | 6/2002  | Gaucher     |
| 6,631,363 | B1 | 10/2003 | Brown et al.|
| 6,677,852 | B1 | 1/2004  | Landt       |
| 6,732,923 | B2 | 5/2004  | Otto        |
| 6,784,802 | B1 | 8/2004  | Stanescu    |
| 6,908,034 | B2 | 6/2005  | Alleshouse  |
| 6,943,683 | B2 | 9/2005  | Perret      |

(Continued)

FOREIGN PATENT DOCUMENTS

EP    11632893    3/2006

(Continued)

OTHER PUBLICATIONS

U.S. Appl. No. 11/025,702, filed Feb. 18, 2005, Kumar, et al.

(Continued)

*Primary Examiner*—John A Tweel, Jr.
(74) *Attorney, Agent, or Firm*—Workman Nydegger

(57) ABSTRACT

The subject invention provides a system and/or a method that facilitates interacting with a device component to provide uniform communication, discovery, and management. A device service provider interface (DSPI) component can provide a uniform manner to communicate and/or manage a radio frequency identification (RFID) device. The DSPI component can include a receiver component that receives one or more RFID server data and RFID device data. The DSPI component can define an interface that facilitates communication of the one or more of RFID server data and RFID device data between an RFID device and an RFID server in a uniform manner. The interface(s) can be defined to handle discovery, configuration, communication, and connection management.

20 Claims, 14 Drawing Sheets

U.S. PATENT DOCUMENTS

| | | | |
|---|---|---|---|
| 7,155,305 | B2 | 12/2006 | Hayes et al. |
| 7,204,409 | B2* | 4/2007 | Kumar et al. ............... 235/375 |
| 7,267,275 | B2 | 9/2007 | Cox et al. |
| 7,295,116 | B2* | 11/2007 | Kumar et al. ............ 340/572.1 |
| 7,382,260 | B2* | 6/2008 | Agarwal et al. .......... 340/572.1 |
| 7,533,812 | B2 | 5/2009 | Kumar et al. |
| 7,557,707 | B2* | 7/2009 | Kumar et al. ............ 340/572.1 |
| 2002/0059471 | A1 | 5/2002 | Sanghvi et al. |
| 2002/0070865 | A1 | 6/2002 | Lancos et al. |
| 2002/0143624 | A1 | 10/2002 | Catan |
| 2002/0170952 | A1 | 11/2002 | Alsafadi et al. |
| 2003/0135576 | A1 | 7/2003 | Bodin |
| 2003/0144926 | A1 | 7/2003 | Bodin et al. |
| 2003/0155413 | A1 | 8/2003 | Kovesdi |
| 2003/0225928 | A1 | 12/2003 | Stephen |
| 2003/0227392 | A1 | 12/2003 | Ebert et al. |
| 2004/0016796 | A1 | 1/2004 | Hanna |
| 2004/0046642 | A1 | 3/2004 | Becker et al. |
| 2004/0070491 | A1 | 4/2004 | Huang et al. |
| 2004/0111335 | A1 | 6/2004 | Black et al. |
| 2004/0193641 | A1 | 9/2004 | Lin |
| 2004/0215667 | A1 | 10/2004 | Taylor et al. |
| 2004/0217864 | A1 | 11/2004 | Nowak |
| 2004/0222298 | A1 | 11/2004 | Dearing |
| 2004/0238635 | A1 | 12/2004 | Ozaki |
| 2004/0245332 | A1 | 12/2004 | Silverbrook |
| 2004/0250066 | A1 | 12/2004 | Di Luoffo |
| 2005/0062603 | A1 | 3/2005 | Fuerst et al. |
| 2005/0092825 | A1 | 5/2005 | Cox et al. |
| 2005/0108628 | A1 | 5/2005 | Grambihler |
| 2005/0150952 | A1 | 7/2005 | Chung |
| 2005/0150953 | A1 | 7/2005 | Alleshouse |
| 2005/0237194 | A1 | 10/2005 | VoBa |
| 2006/0047789 | A1 | 3/2006 | Kumar et al. |

FOREIGN PATENT DOCUMENTS

| | | |
|---|---|---|
| WO | WO 03/102845 | 7/2003 |
| WO | 03102845 | 12/2003 |
| WO | WO 2005078633 | 8/2005 |

OTHER PUBLICATIONS

U.S. Appl. No. 11/061,337, filed Mar. 1, 2005, Kumar, et al.
U.S. Appl. No. 11/069,459, filed Feb. 18, 2005, Kumar, et al.
U.S. Appl. No. 11/061,356, filed May 31, 2005, Kumar, et al.
U.S. Appl. No. 11/141,619, filed May 31, 2005, Kumar, et al.
U.S. Appl. No. 11/140,726, filed May 31, 2005, Kumar, et al.
U.S. Appl. No. 11/141,533, filed May 31, 2005, Agarwal, et al.
European Search Report dated Oct. 2, 2006, mailed Feb. 10, 2006 for European Patent Application Seial No. 05107796, 6 pages.
Tsetsos, et al. "Commerical Wireless Sensor Networks: Technical and Business Issues" Proceedings of the Second Annual Conference on Wireless On-Demand Network Systems and Services (Jan. 19-21, 2005) 8 pages.
Branch, et al. "Sentire: A Framework for Building Middleware for Sensor and Actuator Networks" Proceedings of the Third International Conference on Pervasive Computing and Communications Workshops Mar. 8, 2005) pp. 396-400.
Harrison, et al. "Information Management in the Product Lifecycle-the Role Networked RFID" Proceedings of the Second IEE International Conference (Jun. 24, 2004) pp. 507-512.
Bornhovd, et al. "Integrating Smart Items with Business Processes An Experience Report" Proceedings of the Thirt-Eighth Hawaii International Conference on System Science (Jan. 3, 2005) 8 pages.
Ganesh, et al. "Web Services and Multi-Channel Integration: A Proposed Framework" Proceedings of the IEEE International Conference on Web Services (Jul. 6, 2004) 8 pages.
European Search Report dated Feb. 6, 2006, mailed Feb. 6, 2006 for European Patent Application Seial No. 05107826, 7 pages.
Ortiz. "An Introduction to Java Card Technology -Part 1" http://developers.sun.com/techtopics/mobility/javacard/articles/javacard1/> last viewed Dec. 19, 2005, 14 pages.
Chen. "Understanding Java Card 2.0" URL:.com//javaworld/jw-03-1998/jw-03-javadev_p.html> last viewed Dec. 19, 2005, 12 pages.
IBM "alphaWorks: RFID Device Development Kit: Overview" http://www/alphaworks.ibm.com/tech/rfiddevice last viewed Nov. 7, 2005, 1 page.
Alien "ALR-9800 Enterprise RFID Reader" http://www.alientechnology.com/docs/AT_DS_9800_v3_WEB.pdf last viewed Nov. 17 2005, 4 pages.
Eurpoean Search Report dated Feb. 7, 2006; mailed Feb. 7, 2006 for PCT Application Serial No. EP 05 10 8001; 7 pages.
European Search Report dated Mar. 9, 2006 mailed Mar. 22, 2006 for European Patent Application Serial No. EP05107794, 7 Pages.
Anonymous: "The Sun Global RFID Betwork Vision: Connecting Businesses at the Edge of Network" Internet Article, Jul. 2004, http://www.sun.com/software/solutions/rfid/Sun_RFIS_Vision_rla.pdf.
European Search Report dated Oct. 4, 2006 and mailed Apr. 11, 2006 for EP 05108005, 9 pages.
European Search Report dated May 11, 2006, mailed May 12, 2006 for European Patent Application Serial No. EP05107744, 9 pages.
European Search Report dated Mar. 9, 2006, mailed Mar. 27, 2006 for European Patent Application Serial No. EP05107744, 7 pages.
U.S. Appl. No. 60/606,281, filed Sep. 1, 2004, Kumar, et al.
U.S. Appl. No. 60/606,577, filed Sep. 2, 2004, Kumar, et al.
U.S. Appl. No. 11/025,702, filed Dec. 29, 2004, Kumar, et al.
U.S. Appl. No. 11/061,356, filed Feb. 18, 2005, Kumar, et al.
U.S. Appl. No. 11/069,459, filed Mar. 1, 2005, Kumar, et al.
International Search Report dated and mailed Jul. 27, 2007 for PCT Application Serial No. PCT 2007/004005, 6 pages.
Floerkemier, et al. "PML Core Specification 1.0" Sep. 13, 2003, Auto-ID Center, Version 1.0, 48 pages.
U.S. Appl. No. 11/140,726, filed May 31, 2005, Agarwal, et al.
U.S. Appl. No. 11/141,533, filed May 31, 2005, Kumar, et al.
Office Action dated Jan. 10, 2008 cited in U.S. Appl. No. 11/141,533.
Office Action dated Jul. 28, 2008 cited in U.S. Appl. No. 11/141,533.
Office Action dated Jan. 26, 2009 cited in U.S. Appl. No. 11/141,533.
Office Action dated Jul. 20, 2009 cited in U.S. Appl. No. 11/141,533.
OA Received Dec. 10, 2008 for Chinese Application Serial No. 200510091693.0, 10 Pages.

* cited by examiner

DEVICE SERVICE PROVIDER INTERFACE

CROSS-REFERENCE TO RELATED APPLICATION(S)

This application claims the benefit of U.S. Provisional Patent Application Ser. No. 60/606,281 filed on Sep. 1, 2004, entitled "SYSTEM AND METHODS THAT FACILITATE RFID SERVER PROGRAMMING MODEL AND API'S," and U.S. Provisional Patent Application Ser. No. 60/606,577 filed on Sep. 2, 2004, entitled "FACILITATE RFID SERVER PROGRAMMING MODEL AND API'S." This application is also related to co-pending U.S. patent application Ser. Nos. 11/025,702, 11/061,356, and 11/069,459, filed on Dec. 29, 2004, Feb. 18, 2005, and Mar. 1, 2005, respectively. The entireties of these applications are incorporated herein by reference.

TECHNICAL FIELD

The subject invention generally relates to radio frequency identification (RFID), and more particularly to a system and/or a method that facilitates providing uniform RFID communication and management.

BACKGROUND OF THE INVENTION

Many retail, manufacture, and distribution establishments are applying different and innovative operating methods to increase efficiency. These establishments can monitor store inventory to facilitate optimizing supply and demand relating to consumers. One aspect of maximizing profit hinges on properly stocking inventory such that replenishment occurs in conjunction with exhaustion of goods and/or products. For example, a retailer selling a computer and/or a VCR, must stock the computer in relation to its consumer sales, and the VCR in relation to its consumer sales. Thus, if the computer is in higher demand (e.g., more units sold) than the VCR, the retailer can stock the computer more frequently in order to optimize supply and demand, and in turn, profit. Monitoring inventory and associated sales can be a complex task, wherein product activity is comparable to a black box since inner workings are unknown; yet monitoring products is a crucial element in inventory/product efficiency.

One type of monitoring system relating to products is a portable image collection device (e.g., barcode reader), which is widely used in manufacturing, service and/or package delivery industries. Such devices can perform a variety of on-site data collection activities. Portable data collection devices often include integrated bar code dataform readers adapted to read bar code dataforms affixed to products, product packaging and/or containers in warehouses, retail stores, shipping terminals, for inventory control, tracking, production control and expediting, quality assurance and/or other purposes.

A unique bar code can be placed on a product, wherein the bar code can be associated with information relating to that product. A bar-code scanner can be utilized to scan the barcode on the product, and product related information can be retrieved therefrom. Such identifying information, however, is aesthetically displeasing as such information can clutter the product. Moreover, tears, smudges, annotation or other physical damage/alteration to a barcode can render such conventional systems and/or methodologies substantially useless. If a portion of a bar code is torn from the product, a bar code scanner may not be able to correctly read the bar code. Similarly, a smudge on a product can render such barcode unreadable.

Monitoring systems and/or methods utilizing barcode readers and a universal product code (UPC) confront a user (e.g., retailer, distributor, manufacturer, . . . ) with additional complications. Barcode readers require a line of sight in order to properly monitor products. For example, a typical barcode system requires a scanner to be within 4-8 inches of a barcode and/or UPC to achieve a proper read. Not only does a barcode system require line of sight, manual scans are necessary on each individual product in order to identify the product. Moreover, a single barcode and/or UPC must represent all instances of a product (e.g., a bottle of ketchup of brand Tomato is designated a single UPC and/or barcode for representation of the product). In addition, the amount of information associated to the single barcode and/or UPC is limited. Thus, a scanning of brand Tomato ketchup can give the product identification and a price. Not only is the information insubstantial, but the information is not conducive to real-time product monitoring.

Automatic identification and data capture (AIDC) technology, specifically, Radio Frequency Identification (RFID) has been developed based at least upon the need to cure the above deficiencies of monitoring systems and/or methodologies (e.g., barcode readers, barcodes, and/or UPCs). RFID is a technique of remotely storing and retrieving data utilizing RFID tags. Since RFID systems are based upon radio frequency and associated signals, numerous benefits and/or advantages precede traditional techniques in monitoring products. RFID technology does not require a line of sight in order to monitor products and/or receive signals from RFID tags. Thus, no manual scan is necessary wherein the scanner is required to be in close proximity of the target (e.g., product). Yet, range is limited in RFID based upon radio frequency, RFID tag size, and associated power source. Additionally, RFID systems allow multiple reads within seconds providing quick scans and identification. In other words, an RFID system allows a plurality of tags to be read and/or identified when the tags are within a range of an RFID reader. The capability of multiple reads in an RFID system is complimented with the ability of providing informational tags that contain a unique identification code to each individual product. Therefore, in contrast to a barcode system, each bottle of ketchup made by brand Tomato would have an associated identification code. For example, two bottles of ketchup made by brand Tomato have two distinct identification codes associated thereto within an RFID system; whereas in barcode systems, the two bottles of ketchup made by brand Tomato would have the same barcode and/or UPC. In another example, RFID systems and/or methods can be implemented in water such as tracking and/or monitoring underwater pipe, whereas a barcode monitoring system presents numerous complications under such conditions.

Moreover, RFID systems and/or methodologies provide real-time data associated to a tagged item. Real-time data streams allow a retailer, distributor, and/or manufacturer the ability to monitor inventory and/or products with precision. Utilizing RFID can further facilitate supplying products on a front-end distribution (e.g., retailer to consumer) and a back-end distribution (e.g., distributor/manufacturer to retailer). Distributors and/or manufacturers can monitor shipments of goods, quality, amount, shipping time, etc. In addition, retailers can track the amount of inventory received, location of such inventory, quality, shelf life, etc. The described benefits demonstrate the flexibility of RFID technology to function across multiple domains such as, front-end supply, back-end supply, distribution chains, manufacturing, retail, automation, etc.

An RFID system consists of at least an RFID tag and a RFID transceiver. The RFID tag can contain an antenna that provides reception and/or transmission to radio frequency queries from the RFID transceiver. The RFID tag can be a small object, such as, for example, an adhesive sticker, a flexible label and integrated chip, etc. There are typically four different frequencies the RFID tags utilize: low frequency tags (between 125 to 134 kilohertz), high frequency tags (13.56 megahertz), UHF tags (868 to 956 megahertz) and Microwave tags (2.45 gigahertz).

Within the various frequency ranges, RFID tags can be either passive or active. A passive RFID tag does not include a power supply. When electrical current is induced in the antenna by the received radio frequency from an RFID transceiver, sufficient power is provided for the tag to respond. In many instances, the passive RFID tag response is brief, consisting of an ID number (e.g., Globally Unique Identifier (GUID)). A GUID is a pseudo-random number that is unique and can be implemented by a standard Universally Unique Identifier (UUID) (e.g., a 16-byte number written in hexadecimal format). However, RFID systems and/or methods have converged on storing information in, for instance, multi-bit format (e.g., 64 bit or 96 bit) called a electronic product code (EPC). The lack of power supply in the passive RFID tag allows the device to be small and cost-efficient. Some passive RFID tags are measured to be 0.4 mm×0.4 mm, with a thickness thinner than a sheet of paper. Yet, the absence of the power supply limits the practical read range of the passive RFID tag from 10 mm to about 5 meters.

An active RFID tag contains a power source providing longer read ranges. A typical active RFID tag is about the size of a U.S. currency coin, and provides read ranges of about tens of meters, while maintaining a battery life of up to several years. Furthermore, active RFID tags can be read and/or written. For instance, RFID tags can provide an additional security layer to deter theft by writing to an active RFID tag. A security bit can determine a security status based at least upon a RFID transceiver. In one security system, for example, an active RFID tag can have a security bit set/written to one, which can indicate the product is not cleared to leave a secure area without triggering an alarm/warning. Once the appropriate conditions exist, the RFID system and/or method can write the bit on the tag to a zero, which can indicate the tagged product is cleared to leave the secure area.

In general, an RFID system can include multiple components: tags, tag readers (e.g., tag transceivers), tag-programming stations, circulation readers, sorting equipment, tag inventory wands, etc. Moreover, various makes, models, types, and/or applications can be associated with respective components (e.g., tag, tag readers, tag programming stations, circulation readers, sorting equipment, tag inventory wands, . . . ), which can complicate discovery, configuration, setup, communication, maintenance, security, and/or compatibility within the RFID system and with other RFID systems. In view of the above, there is a need to provide a uniform way to discover, configure, setup, and communicate to RFID devices in respect to the maker and associated specifications.

SUMMARY OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject invention relates to systems and/or methods that facilitate interacting with a radio frequency identification (RFID) device and/or other real-time event generation systems (e.g., a sensor, a web service, . . . ). A device service provider interface (DSPI) component can provide an abstraction layer to communicate and manage device(s) in a uniform manner regardless of the device's type and/or brand. In particular, the DSPI component defines at least one interface for a device vendor (e.g., reader vendor) to provide a service to an RFID server uniformly. Thus, the DSPI component is a layer between the server and at least one device. Moreover, the DSPI component can define an interface to handle: discovery, configuration, communication, and connection management.

In accordance with one aspect of the subject invention, the DSPI component can include a receiver component that receives one or more of a protocol translation that relates to a device, RFID server data, RFID device data, etc. The DSPI component facilitates communicating uniformly to the device and exposing functionality of the device regardless of a device vendor and the protocol standard. In addition, the receiver component can be either external and/or internal in relation to the DSPI component. It is to be appreciated that a device can be, but is not limited to, an RFID reader, an RFID writer, an RFID transmitter, an RFID device, a sensor, a real-time generation system, a real-time sensor, a device extensible to a web service, and a real-time event generation system.

In accordance with another aspect of the subject invention, the DSPI component can include a request response component that defines a message exchange in the device layer. It is to be appreciated that the message exchange can be asynchronous. Furthermore, the message exchange can be a request response pair, a notification, a command, and/or a property. The message exchange is utilized by the request response component, wherein the message exchange is markup language syntax between the RFID server and at least one RFID device. The markup language can be, but is not limited to, an extensible markup language (XML), a hypertext markup language (HTML), a standard generalized markup language (SGML), and an extensible hypertext markup language (XHTML).

Furthermore, the DSPI component can include a device interface component that defines a message layer and/or a transport layer. The device interface component provides the messaging and connecting management between the RFID server and at least one RFID device. The device interface component can utilize markup language syntax in order to send and/or receive messages (e.g., notification, response, request, . . . ).

In yet another aspect of the subject, the DSPI component can include a device discovery interface component that discovers RFID devices. Thus, the device discovery interface component can define an interface that can inform and/or report new RFID device(s). In order to be efficient, the device discovery interface component can instantiate one component per provider. Furthermore, the DSPI component can include an SPI container component that facilitates loading the DSPI provider into the RFID server. The SPI container component maintains version-ability between the RFID server and the SPI. Moreover, the SPI container component can register at least one driver with the RFID server.

The following description and the annexed drawings set forth in detail certain illustrative aspects of the invention. These aspects are indicative, however, of but a few of the various ways in which the principles of the invention may be employed and the subject invention is intended to include all such aspects and their equivalents. Other advantages and novel features of the invention will become apparent from the following detailed description of the invention when considered in conjunction with the drawings.

DESCRIPTION OF THE INVENTION

Figure 1:
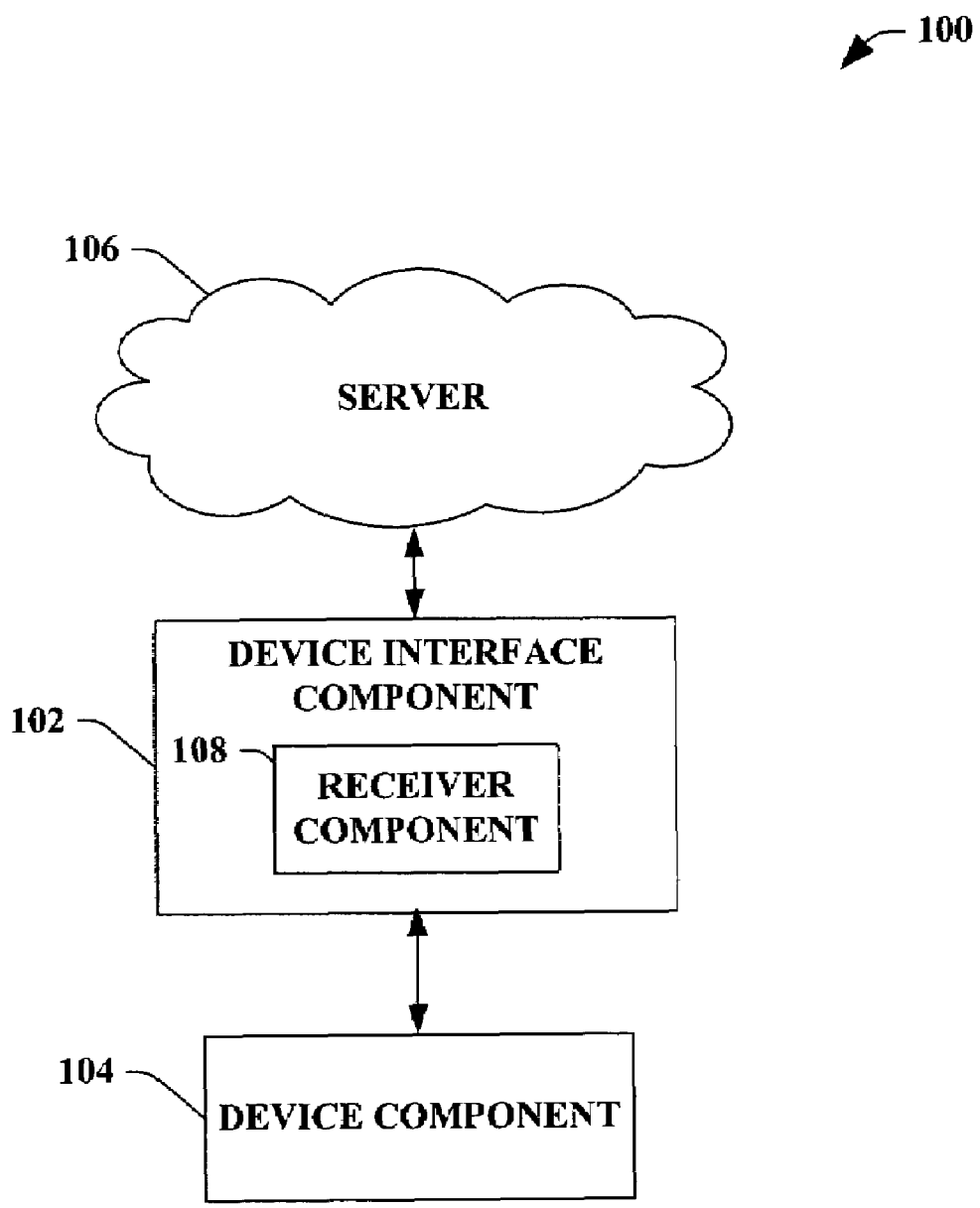
FIG. 1 illustrates a block diagram of an exemplary system that facilitates interacting with a device component.

As utilized in this application, terms "component," "system," and the like are intended to refer to a computer-related entity, either hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

The subject invention is described with reference to the drawings, wherein like reference numerals are used to refer to like elements throughout. In the following description, for purposes of explanation, numerous specific details are set forth in order to provide a thorough understanding of the subject invention. It may be evident, however, that the subject invention may be practiced without these specific details. In other instances, well-known structures and devices are shown in block diagram form in order to facilitate describing the subject invention.

Artificial intelligence based systems (e.g., explicitly and/or implicitly trained classifiers) can be employed in connection with performing inference and/or probabilistic determinations and/or statistical-based determinations as described herein. As used herein, the term "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject invention.

Now turning to the figures, FIG. 1 illustrates a system 100 that facilitates interacting with a device component to provide uniform communication and/or management. The system 100 can employ a device interface component 102 to provide an abstraction layer that communicates and manages a device component 104 in a uniform manner. The device interface component 102 can act as a "middle intermediary" between a server 106 and the at least one device component 104. The server 106 can be, for example, an RFID server, wherein at least one service (e.g., publish, subscribe, query, poll, manage, monitor, update, etc.) and/or programmed computer process (e.g., related to manufacturing and/or shipping, etc.) can be provided to the device component 104. Furthermore, the device interface component 102 can include a receiver component 108 that receives one or more of server data, a protocol translation that relates to a device, RFID server data, RFID device data, etc. It is to be appreciated that the device interface component 102 facilitates communicating uniformly to the device and exposing functionality of the device regardless of a device vendor and the protocol standard. In addition, the receiver component 108 can be either external and/or internal in relation to the device interface component 102. It is to be further appreciated that a device can be, but is not limited to, an RFID reader, an RFID writer, an RFID transmitter, an RFID device, a device, real-time sensor, a sensor, a device extensible to a web service, and a real-time event generation system.

Device vendors (e.g., individual hardware vendor (IHV) that specialize in hardware manufacturing of a specific type of hardware device and associated software driver) can utilize the device interface component 102 in order to provide services to middleware products based at least in part upon the plethora of devices and associated command sets. In other words, one device from a vendor can utilize one set of commands, while another device can utilize a substantially different set of commands. To mitigate the problems relating to the various vendors and command sets, the device interface component 102 can define an interface for a device vendor that provides services to the server 106 in a uniform manner. Therefore, server 106 can utilize the device interface component 102 to interact with the device component 104 with a uniform technique that provides device flexibility. Moreover, the device interface component 102 can provide an interface and/or interfaces to delegate discovery, configuration, communication, and connection management of the device component 104. It is to be appreciated the device interface component 102 can interact with numerous device components 104, wherein provider(s) are associated to each device component 104.

For instance, various legacy systems (e.g., wherein a legacy system is typically a reader and/or device that have proprietary protocols for communication that are obsolete in the face of new standards) by definition utilize obsolete devices and/or software. These legacy systems can employ the device interface component 102 allowing an interface and/or interfaces to provide multiple legacy devices and providers a uniform interaction with the server 106. Thus, the obsolete device component 104 and associated provider (not shown) can be utilized to provide a variety of services and/or processes via the device interface component 102 and server 106.

In one example, the device interface component 102 can be utilized in order to provide a uniform technique for interaction between a plurality of device components 104 and a server 106. The device components 104 can be, for instance, legacy devices, auto-identification devices, EPC-Global compliant devices, etc. Additionally, it is to be appreciated that each device component 104 can have an associated provider (e.g., EPC-G compliant provider, proprietary provider, legacy provider, . . . ). Thus, the device interface component 102 can provide a uniform interaction between multiple providers utilizing various command sets for device components 104 and a server 106.

The device interface component 102 can provide normalization across multiple standards representative of the numerous device components 104, a web service, and/or real time event generation systems (not shown). Thus, the device components 104 can be an RFID device and/or a sensor device. Furthermore, utilizing the device interface component 102 enables hardware innovations to surface to a higher level. The device interface component 102 can be implemented by a provider (not shown), which can be, for instance, a processor independent platform assembly. The provider can implement an interface and/or interfaces defined by the device interface component 102. By defining the interface for the provider, the device interface component 102 interacts with the device component 104 by employing device specific commands. Thus, the device interface component 102 minimizes device specific details from the RFID server 106.

Figure 2:
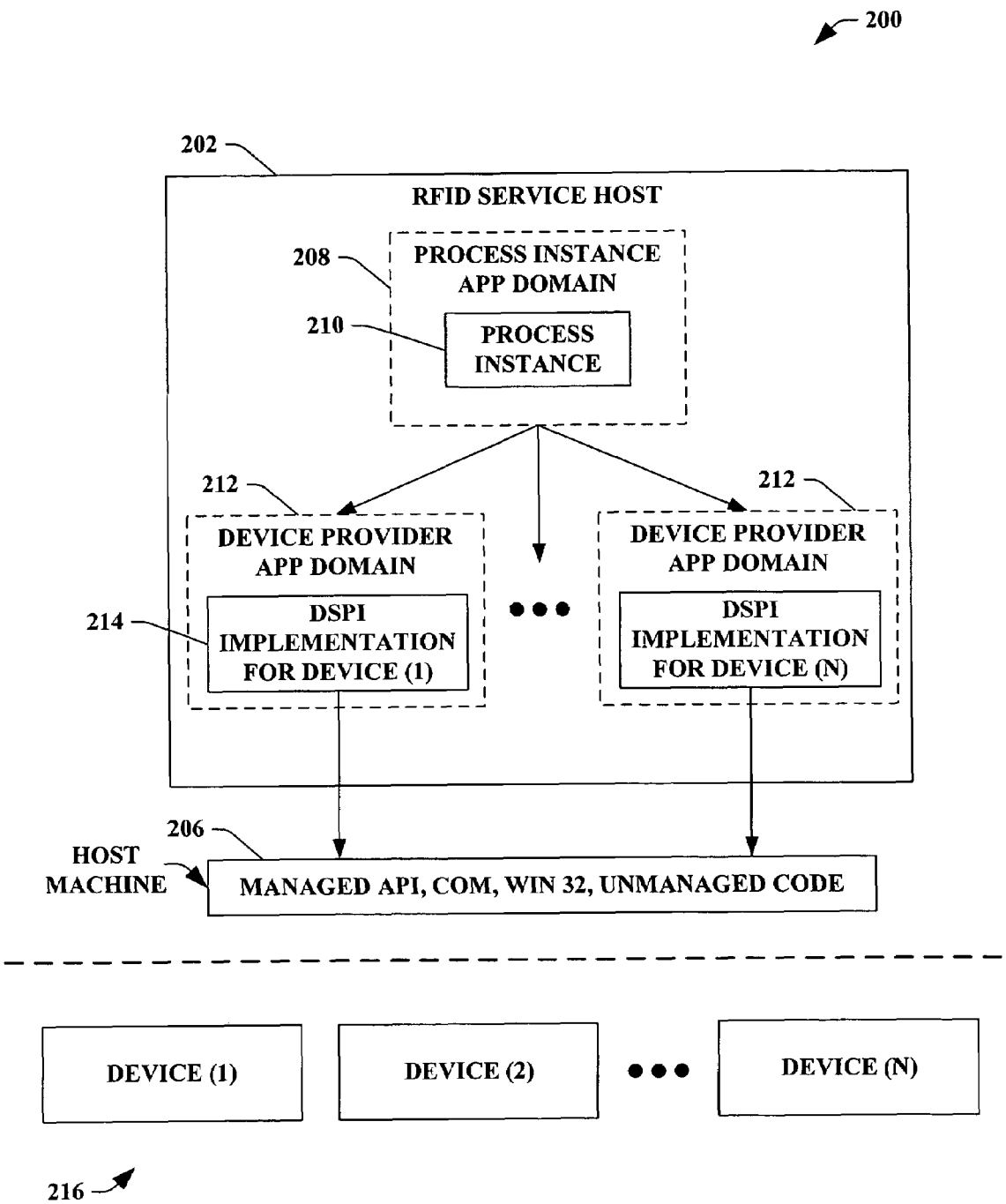
FIG. 2 illustrates a block diagram of an exemplary system that facilitates interacting with a device.

FIG. 2 illustrates a system 200 that provides an overview in respect to the novelty of the subject invention. For instance, an RFID device vendor needs a uniform way of providing their services to a host layer running on an operating system platform, as each device supports a different command set, a protocol(s), and/or behavior. The Device Service Provider Interface (DSPI) is an abstraction layer for an RFID services platform to communicate with and manage RFID devices uniformly. This layer provides for normalization across multiple communication protocols, support for Legacy Readers and other Auto-ID devices in uniform manner, as well as providing the ability to surface key hardware innovations to the higher layers.

The DSPI defines the abstract classes (for handling discovery, configuration, communication, and device & connection management) that device vendors can implement to provide services to the RFID services platform on the operating system in a uniform way. The providers can run under a RFID services host 202 as a managed entity, and could communicate with one or more devices 216 itself via, for example, managed API, unmanaged code, a COM implementation, or Win 32 API's, based on the transport supported referred to as a host machine 206.

In particular, a process instance app domain 208 can contain a process instance 210, wherein the process instance app domain 208 can interact with at least one device provider app domain 212. The device provider app domain 212 can contain a DSPI implementation 214 for a device, wherein there can be a plurality of devices 216 associated therewith. It is to be appreciated that there can be one to N devices, wherein N is an integer as depicted in the figure.

Device Service Providers would fall under at least one of the following categories: 1) Pure Managed code implementation using one of the standard protocols [HTTP, TCP, SERIAL (e.g., Samsys); 2) Managed code protocol implementation but calling unmanaged code (e.g. USB Reader device, a proxy connecting to a different protocol handler process); 3) Managed code wrapper for a proprietary protocol implemented as windows device driver (e.g., Pure Printer drivers such as SATO).

Figure 3:
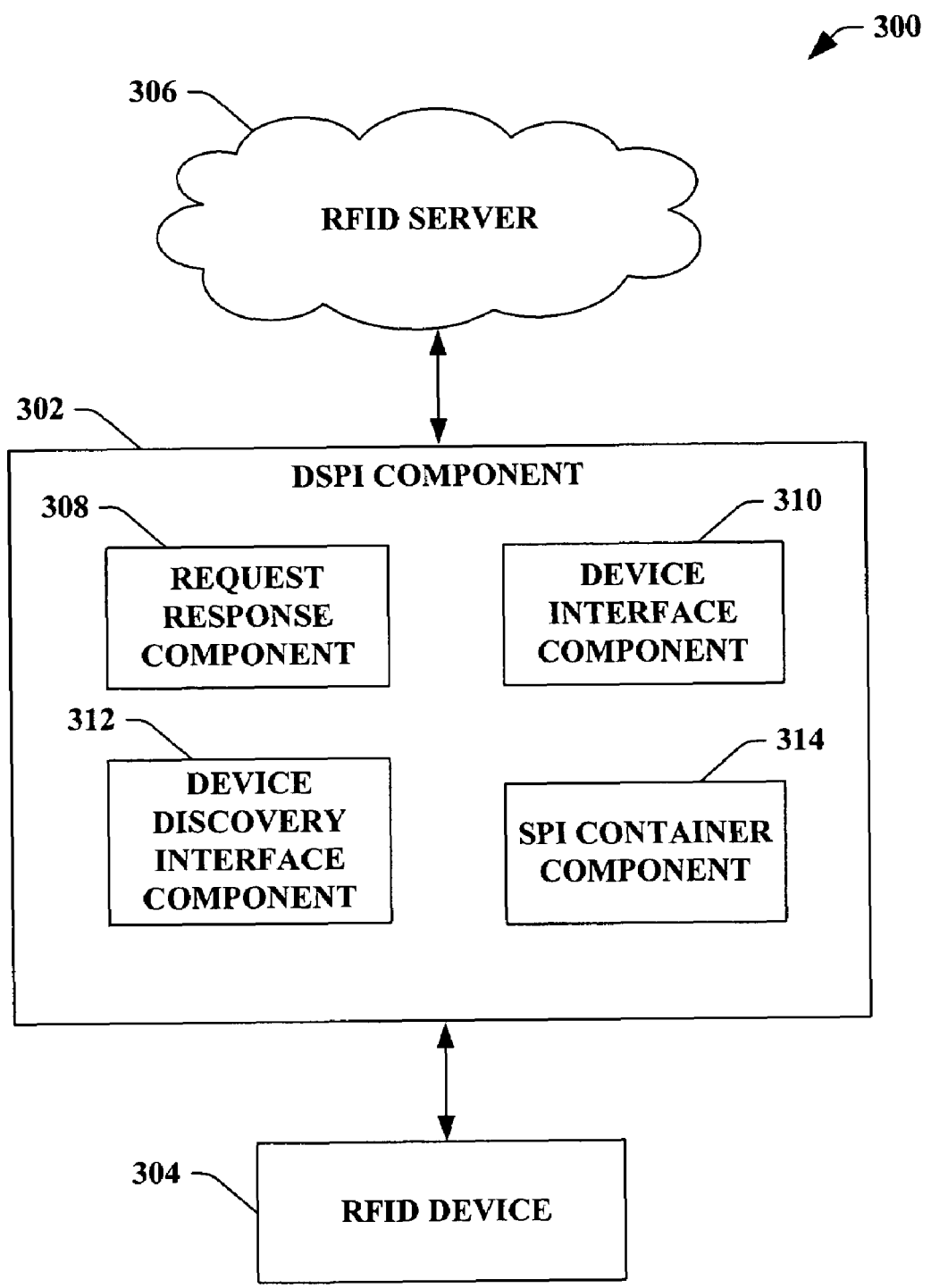
FIG. 3 illustrates a block diagram of an exemplary system that facilitates interacting with a device within a radio frequency identification system.

FIG. 3 illustrates a system 300 that facilitates interacting with a device to provide uniform techniques for communication and/or management. An RFID server 306 can communicate with an RFID device 304 by utilizing a device service provider interface (DSPI) component 302. It is to be appreciated that the RFID server 306 can communicate with a sensor (not shown) as well as any RFID device 304. An RFID device provider (not shown) can employ the DSPI component 302, which can define at least one DSPI component that facilitates interacting with the RFID server 306. The interfaces defined by the DSPI component 302 can be implemented by IHV's for protocol translation to expose device functionality to the DSPI component 302. It is to be appreciated the DSPI component 302 provides uniform interaction with an RFID server and a plurality of RFID devices 304. It is to be appreciated that an RFID device 304 can be, but is not limited to, an RFID reader, an RFID writer, an RFID transmitter.

The DSPI component 302 can further include a request response component 308 that facilitates handling messages with the RFID device 304. The request response component 308 defines a message exchange between the RFID server 306 and the RFID device(s) 304. The message exchange can be, for example, message pairs (e.g., where a first message can trigger a second message utilizing vendor specific commands), a request, a reply, a notification, an event, a property, a query, an acknowledgement, a flag, etc. It is to be appreciated that the request response component 308 defines at least one message exchange that is asynchronous and/or synchronous. Thus, a message exchange from the request response component 308 that is asynchronous does not trigger an immediate response from a request.

For example, a legacy device and/or proprietary provider can implement the DSPI component 302 in order to utilize uniform communicative techniques. It is to be appreciated that the provider that implements the DSPI component can be, for instance, a processor independent platform assembly. The DSPI component 302 defines an interface from which the assembly can implement in relation to the RFID device 304. In other words, the DSPI component 302 employs a uniform command set of which a plurality of devices and/or a plurality of providers can utilize in order to provide IHv services to the RFID server 306.

Moreover, the DSPI component 302 can include a device interface component 310. The device interface component 310 defines the message layer and/or the transport layer. The message layer and/or transport layer can be implemented by a markup language such as, but is not limited to, an extensible markup language (XML), a hypertext markup language (HTML), a standard generalized markup language (SGML), and an extensible hypertext markup language (XHTML). It is to be appreciated that the transport layer can be independent of the message layer. Additionally, the device interface component 310 delegates message and connection management. In order for communications and/or interactions with the RFID server 306 to persist, the device interface component 310 can define the message and transport layer. In conjunction with the request response component 308, the device interface component 310 manages messaging with the RFID device 304 and RFID server 306 utilizing the message pairs (e.g., defined by the request response component 308) and the message/transport layer (e.g., defined by the device interface component 310). Furthermore, the connection of each device is managed (e.g., controlled, established, determined, relinquished, monitored, etc.) by the device interface component 310 via the message/transport layer.

To facilitate discovering the RFID device 304, the DSPI component 302 can include a device discovery interface component 312. In other words, the device discovery interface component 312 defines device discovery mechanism(s). Such discovery mechanisms can be, but are not limited to, discovery start, discovery stop, connection requirement data (e.g., device id, provider name, etc.). It is to be appreciated that the device discovery interface component 312 efficiently instantiates one DSPI component per provider, wherein the devices associated to such vendor are handled (e.g., controlled, managed, monitored, etc.). Moreover, it is to be appreciated the provider can implement the device discovery interface component 312.

The DSPI component 302 can further include an SPI container component 314 that loads the providers (not shown) into the RFID server 306. By loading the provider into the RFID server 306, the provider configuration and registration is handled by the SPI container component 314. The SPI container component 314 provides version and identification information relating to providers. In addition, SPI container component 314 is the uber-gateway to provider implementation. The SPI provider(s) can be, for instance, processor independent platform assemblies. It is to be appreciated that the provider(s) can utilize the drivers interchangeably.

For example, the providers can be processor independent software assemblies that enable the creation and/or use of markup language applications, processes, and websites as services that can share and/or combine information and functionality with each other by design, or platform, or smart device, to provide tailored solutions. By utilizing such assemblies, various benefits and/or advantages are provided. Driver versioning problems can be solved utilizing such assembly versioning since different versions of a driver can exist on the server at a time. Thus, when changing from one version to another, the assembly allows multiple versions to be utilized, wherein the correct version is available. Drivers written in such an assembly format are not susceptible to buffer overruns, errors, and the like. The exceptions from the driver can be isolated such that the server stability is unaffected. Additionally, IHV's can digitally sign drivers to ensure authenticity and/or veracity.

Figure 4:
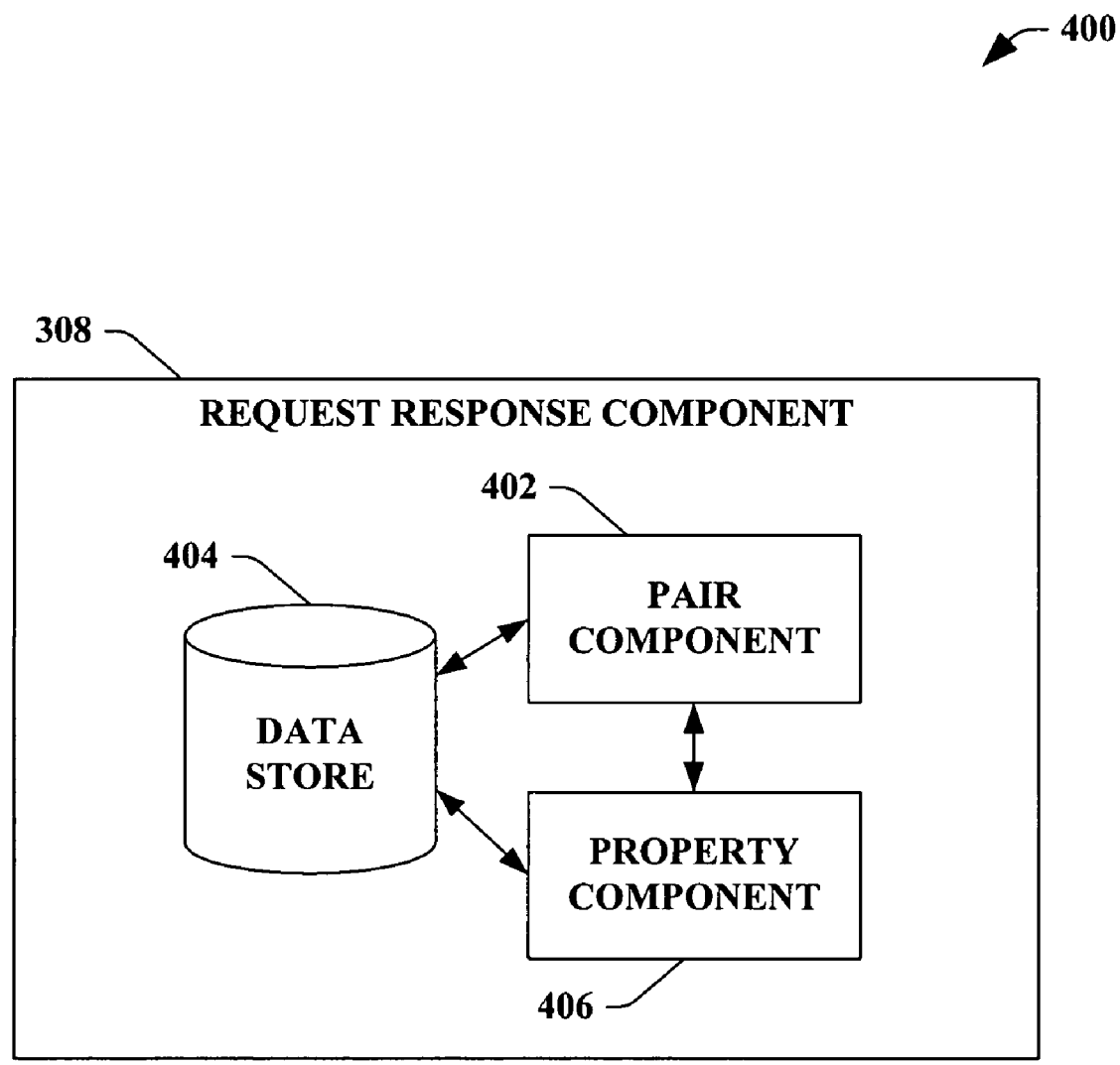
FIG. 4 illustrates a block diagram of an exemplary system that facilitates communicating with a device.

FIG. 4 illustrates a system 400 that facilitates interacting with a device to provide uniform techniques for communication and management. The request response component 308 can include a pair component 402 that provides message exchange pairs that allow a device (not shown) and a server (not shown) to communicate. For example, the message exchanges can be defined as request response pairs that are asynchronous. Moreover, the message exchange is matched (e.g., paired) utilizing identification. The identification can be, for instance, a message identification that is unique to a particular corresponding pair. It is to be appreciated that the pair component 402 can support vendor specific commands (e.g., message exchange pairs, request response pairs, etc.). In addition, a command/routine (e.g., "SendMessage( )" discussed infra) can be utilized to send requests to the device.

The pair component 402 can utilize a data store 404 wherein the message exchange pairs can be stored. It is to be appreciated the data store 404 can be an in-memory database within the DSPI (not shown) and/or on a remote server. The data store 404 can be employed to retain request response pairs that are supported by the DSPI component (not shown). Furthermore, the data store 404 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 404 of the subject systems and methods is intended to comprise, without being limited to, these and any other suitable types of memory.

The pair component 402 supports a plurality of message exchange pairs. For instance, the following table, Table 1, illustrates a sample of suitable request response pairs (and a description) which can be utilized to communicate between a device and a server:

TABLE 1

| Command | Response | Description |
| --- | --- | --- |
| WriteId (string id, string passCode) | Status Code and/or Error | Writes ID to a tag. Id- Tag Id to write as a hex encoded string. passCode - optional password as a hex encoded string. If Id is null, it is equivalent to a writePassCode command, |
| GetTagData (string id) | User Data as provider specific string | Reads a particular tag's (user) data given by Tag Id. All user data present on the tag is returned without any fine grained access. |
| WriteTagData(string id, string data) | Status Code and/or Error | Writes User data to a particular tag given by Tag Id. Data string is in provider specified encoding. |
| GetTagIds( ) | List of Strings | Reads all the tags and data available at the time of call and returns as a collection. It is a real time call which returns all the tags accessible by the device at that instant of time from one or more antennas. |
| GetTagList( ) | Tag List | List of ID/Source read entries in the tag list. |
| ClearTagList( ) | Status Code and/or Error | Clears Tag list. |
| GetTagMetaData(string id) | Tag Details | Reads a particular tag's details (type, manufacture number, |

TABLE 1-continued

| Command | Response | Description |
|---|---|---|
| | | blocks, etc.) given by Tag Id. |
| LockTag(string id, string lockCode) | Status Code and/or Error | Locks a particular tag. lockCode is needed if it was set earlier. |
| Kill (string id, string killCode) | Status Code and/or Error | Kills a tag. killCode is needed if it was set earlier. |
| AddReadFilter (string bitMask, bool incExc) | Status Code and/or Error | Adds a simple bit mask filter to the device. |
| RemoveReadFilter(string bitMask, bool incExc) | Status Code and/or Error | Removes the specified filter from the device |
| ClearReadFilters( ) | Status Code and/or Error | Clears all the filters in the device. |
| Reboot( ) | Status Code and/or Error | Reboot the device. Any connection to the device is lost and is not re-established. |
| WriteId (string id, string passCode) | Status Code and/or Error | Writes ID to a tag. Id - Tag Id to write as a hex encoded string. passCode - optional |

TABLE 1-continued

| Command | Response | Description |
|---|---|---|
| | | password as a hex encoded string. If Id is null, it is equivalent to a writePassCode command. |

Furthermore, the pair component 402 can provide a reply and/or a notification (e.g., received through "CmdResponseEvent" and "NotificationEvent" respectively). For instance, the notification event "ReadTagEvent" can be utilized in event mode and sent by the device to report a tag read/detect event.

The request response component 308 can further include a property component 406 that can provide property pairs defined by the DSPI component (not shown). The property pairs can, for example, have substantially similar behavior to the message exchange pairs. In particular, the properties can be "get" or "set," which do not throw exceptions. It is to be appreciated the properties can be manipulated by a common mechanism (e.g., requests sent via SendMessage( ) method, discussed infra). It is to be appreciated that standard properties can be defined by the DSPI component (not shown), while the specific provider can define other properties. The provider(s) can support a property called REQUEST-TIMEOUT (e.g., in milliseconds) for a time-out request. It is to be appreciated that the property component 406 can utilize the data store 404 to store the properties.

The property component 406 supports a plurality of property pairs. For instance, the following table, Table 2, illustrates various property pairs (and a description) which can be utilized to communicate between a device and a server:

TABLE 2

| Command | Response | Description |
|---|---|---|
| GetProperty(string propertyGroupName, string propertyName) | Property object. NULL if no such property. | Get the specified property. |
| SetProperty(Property property) | Status Code and/or Error | Set the property. |
| ApplyPropertyProfile(Property[ ] propertyProfile) | Status Code and/or Error | A plurality of properties can be applied at the same time using this method. Here's a scenario where such functionality will be useful: A set of properties need to be set for optimal performance of the device. All these can be specified as a profile in the device configuration. They can be applied at once by the server. |
| GetProperty(string propertyGroupName, string propertyName) | Property object. NULL if no such property. | Get the specified property. |
| SetProperty(Property property) | Status Code and/or Error | Set the property. |

Furthermore, the property component 406 supports a plurality of standard properties. For instance, the following table, Table 3, illustrates a standard property, specifically whether the property is read and/or write and a description:

TABLE 3

| Property | Read/Write | Mandatory | Description |
|---|---|---|---|
| REQUEST_TIMEOUT | R/W | Yes | In milliseconds, timeout period for request messages. Provider sends a TIMEOUT response after this period has expired. |

The request response component 308 can utilize program code in order to utilize message exchange between a device and a server. The program code can be a markup language such as, but is not limited to, an extensible markup language (XML), a hypertext markup language (HTML), a standard generalized markup language (SGML), and an extensible hypertext markup language (XHTML). For example, a markup language can be utilized to provide a syntax for request, response, and notifications. It is to be appreciated that the request, notification, etc. can be represented as programmed objects in the DSPI component (not shown) to provide strong typing.

Figure 5:
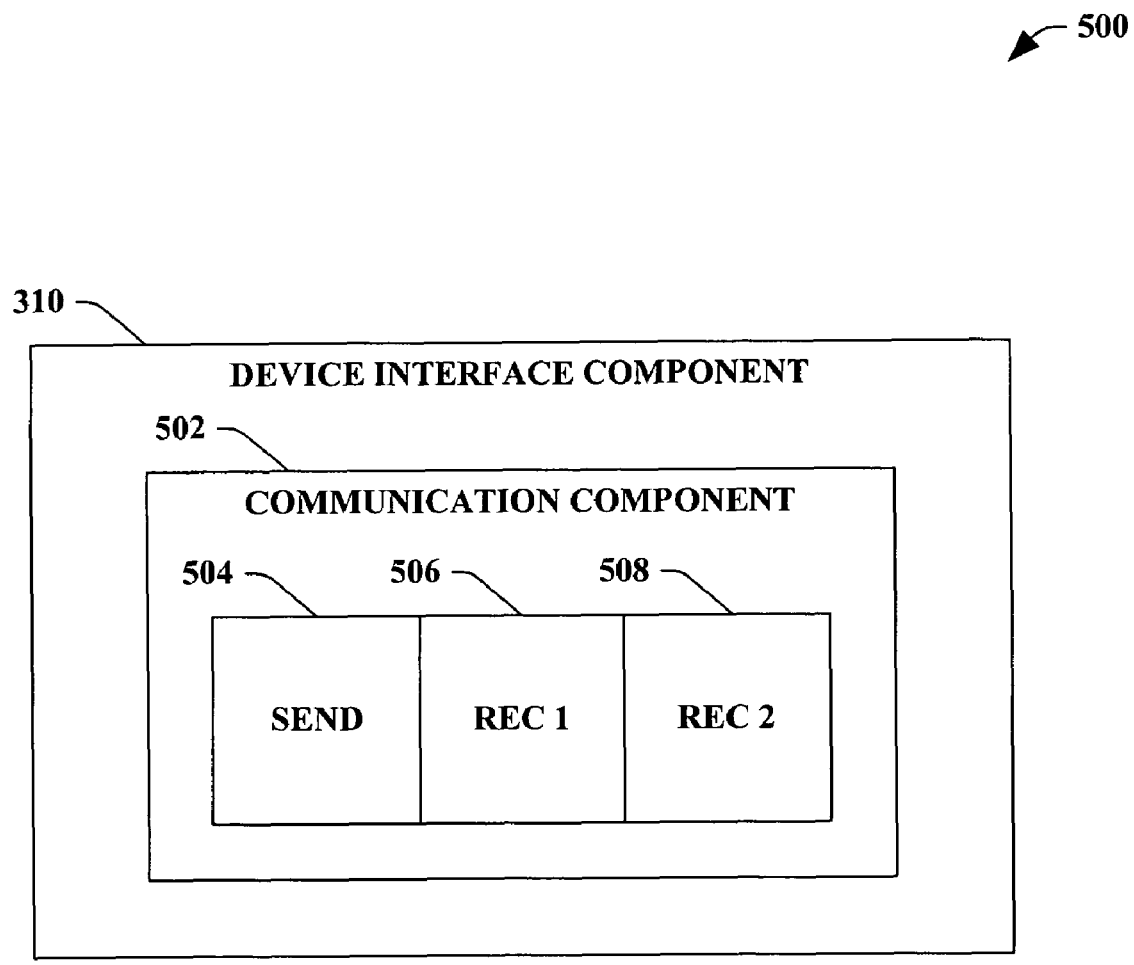
FIG. 5 illustrates a block diagram of an exemplary system that facilitates communicating with a device.

FIG. 5 illustrates a system 500 that facilitates interacting with a device to provide uniform techniques for communication and management. The device interface component 310 can include a communication component 502 that facilitates defining a message layer and a transport layer. Moreover, the device interface component 310 further contains techniques for messaging and connection management. It is to be appreciated that the communication component 502 can contain at least one send channel and at least one receive channel to implement the message layer and the transport layer.

For instance, the communication component 502 can include a send channel 504. The send channel can utilize "SendMessage( )" in order to send information. In addition, the communication component 502 can have a first receive channel 506 and a second receive channel 508. The first receive channel 506 can utilize "CmdResponseEvent" for responses (e.g., for request), while the second receive channel 508 can utilize "NotificationEvent" for notifications. The response event can be for synchronous request-response commands, while the notifications can be for asynchronous, wherein notifications can be a tag list event, a reader management event, etc. It is to be appreciated that the device interface component 310 can also utilize a "ProviderException." The "ProviderException" is the top level exception for all the provider related exceptions. Any inner exception can be passed inside this exception. For example, the following code can define a ProviderException Class:

```
public class ProviderException : ApplicationException {
    public ProviderException(string message):base(message) {
    }
    public ProviderException(string message, Exception e):base(message, e) {
    }
}
```

The communication component 502 can send messages to the device. The following code is an example of implementing "SendMessage( )" to send a message:
void SendMessage (ICommand command);

The communication component 502 can also throw exceptions such as, but are not limited to, ConnectionDownException, SendFailedException, System.ArgumentException (e.g., when a message parameter is invalid), etc. Moreover, the communication component 502 can utilize the following code:
event ResponseEventHandler CmdResponseEvent;

The code above is an event that is generated when a response to a request is received. It is to be appreciated that the above code can be given by a device when a response to a command is received. Additionally, the communication component 502 can utilize the following code:
event ResponseEventHandler NotificationEvent;

The event above is generated when a notification event is received by the device. Moreover, the above code can be given by a device when an asynchronous event is received. It is to be appreciated the device interface component 310 can utilize various code and/or events.

The code below can be implemented by the device interface component 310 in order to open the message layer for communication. It is to be appreciated the standard ML (SML) message requests are sent utilizing the following code:

```
public abstract class DeviceInterface
{
    public abstract DeviceInformation DeviceInformation {get;}
    public abstract event ResponseEventHandler CmdResponseEvent;
    public abstract event NotificationEventHandler NotificationEvent;
    public abstract void SendMessage(Command command);
    public abstract bool SetupConnection( );
    public abstract void Close( );
    public abstract bool IsConnectionAlive( );
    public abstract HashTable GetSources( );
}
public delegate void ResponseEvent(object source, ResponseEventArgs args);
public delegate void NotificationEvent(object source, NotificationEventArgs args);
public class ResponseEventArgs:EventArgs
{
private Command command;
public ResponseEventArgs(Command command) {...}
}
public class NotificationEventArgs:EventArgs
{
private Notification notification;
public NotificationEventArgs(string id, Notification.Notification notification)
{...}
}
public class RfidProviderException : ApplicationException {...}
public class ConnectionDownException : RfidProviderException {...}
public class SendFailedException : RfidProviderException {...}
// connection management
public class ConnectionFailedException : RfidProviderException {...}
```

"DeviceInformation DeviceInformation {get;}" provides device information relating to this device instance. It contains all information about this device. The device information class is provided at the time of discovery in the discovery event and from the device interface component 310. For example, the device information class can be defined as follows:

```
public class DeviceInformation
{
private string deviceId;
private ConnectionInformation connectionInfo;
private object providerData;
}
```

"void SendMessage (ICommand command);" is the command utilized to send all messages in the device layer. The following exceptions can be thrown: ConnectionDownException (e.g., device is either not connected or connection went down); SendFailedException (e.g., connection to the device exists, but sending message to the device failed); System.ArgumentException (e.g., when the message parameter is invalid); etc. The function "event ResponseEventHandler CmdResponseEvent;" is an event that is generated whenever a response to a request comes. "event NotificationEventHandler NotificationEvent;" is an event that is generated whenever an asynchronous notification event is received from the device. Furthermore, the following code can be utilized in handling exceptions relating to the communications:

```
public delegate void ResponseEvent(object source, ResponseEventArgs
args);
public class ResponseEventArgs:EventArgs {
    public readonly string id; // same as message id
    public readonly string data; // an xml string
    public ResponseEventArgs(string id, string data) {...}
}
public class ReaderTimeoutException :Exception{
    public readonly string messageId;
    public ReaderTimeoutException(string messageId) {...}
}
```

It is to be appreciated that the above code can contain the techniques for properties and/or management. Additionally, the code below can create classes related to the exceptions as follows:

```
public class ProviderException : ApplicationException {...}
public class ConnectionDownException : ProviderException {...}
public class SendFailedException : ProviderException {...}
public class ConnectionFailedException : ProviderException{...}
void SendMessage(string message);
```

The device interface component 310 can also manage the connection maintained with a device. It is to be appreciated that the management of such connection can be for a plurality of devices associated to a provider. The connection to the device is maintained utilizing various functions (discussed infra). It is to be appreciated that the provider maintains the connection to the device until such connection is closed using the function "Close( )." The connection management can be employed by utilizing the following code:

```
bool SetupConnection( );
void Close( );
bool IsConnectionAlive( );
HashTable GetSources( );
```

"bool SetupConnection( );" sets up a connection to the device (e.g., abstracted by this DeviceInterface instance). This method can utilize the following exception: ConnectionFailedException (e.g., connecting to the device failed). "void Close( );" can remove states related to the device from the driver and/or close the connection. "bool IsConnectionAlive( );" returns true if connection to the device (e.g., abstracted by this DeviceInterface instance) exists. "HashTable GetSources( );" returns all the sources (e.g., antenna) at the device as name versus status (e.g., true if the source is connected and active).

Figure 6:
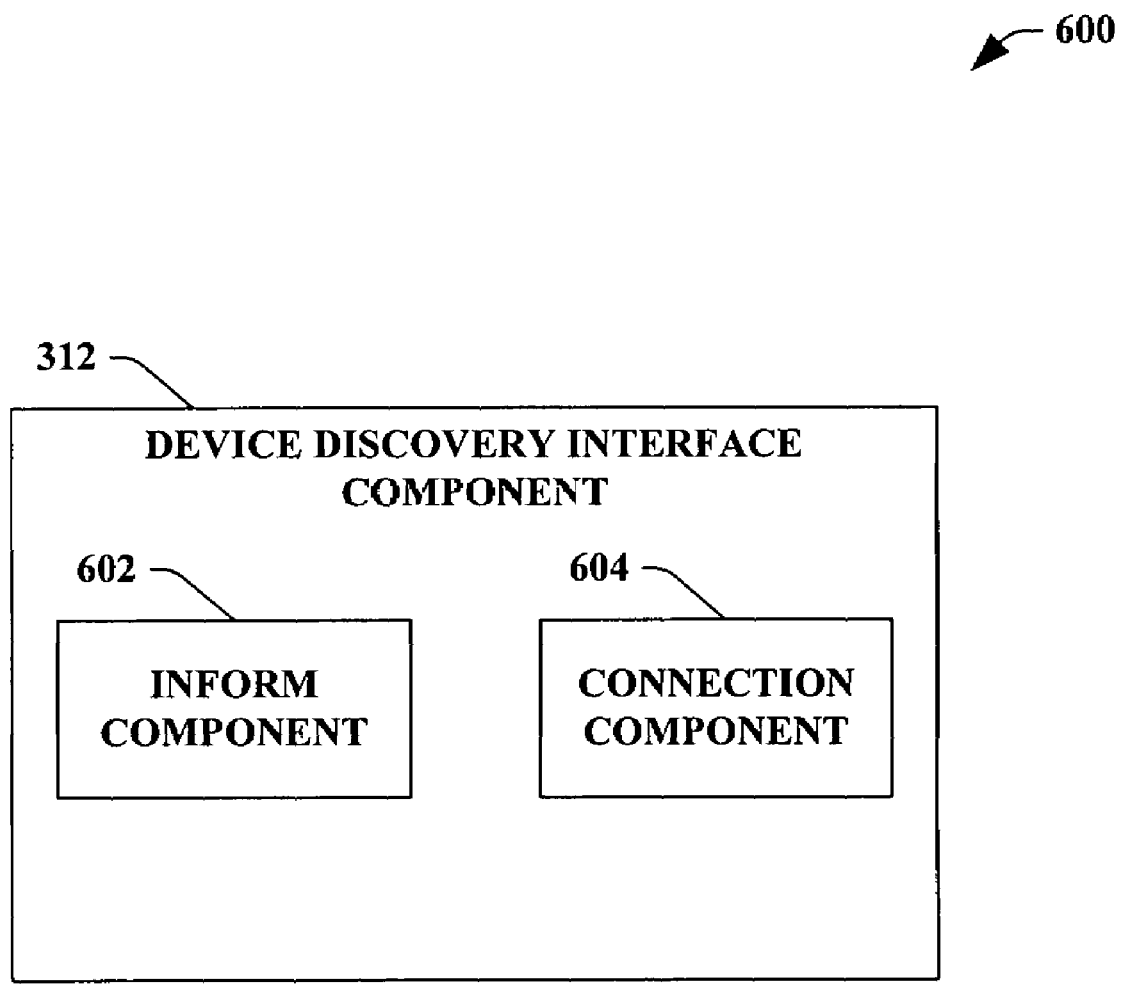
FIG. 6 illustrates a block diagram of an exemplary system that facilitates communicating with a device.

FIG. 6 illustrates a system 600 that facilitates interacting with a device to provide uniform techniques for communication and management. The device discovery interface component 312 can include an inform component 602 that informs the DSPI component (not shown) of a new device that is detected. The inform component 602 is extremely efficient such that one component is instantiated per provider so that the devices can be handled. It is to be appreciated that since the server may not have control over resources, the provider implements the device discovery interface component 312. Yet, the provider may implement such a device discovery interface component 312 and is not so limited. For example, the number of threads created can depend on the number of devices of a particular type. Moreover, if the discovery thread(s) encounter an error during execution, the provider can handle such error(s) in order to allow the threads to run. Moreover, the device discovery interface component 312 can define the device discovery mechanism by utilizing an interface such as, but is not limited to, DeviceListenerInterface.

The inform component 602 can provide discovery of a newly detected device by utilizing the following code:

```
public abstract class DeviceListenerInterface
{
    public abstract event DiscoveryEventHandler DiscoveryEvent;
    public abstract void StartDiscovery( );
    public abstract void StopDiscovery( );
}
public delegate void DiscoveryEventHandler(object source,
DiscoveryEventArgs args);
public class DiscoveryEventArgs:EventArgs {
    private DeviceInformation deviceInfo;
```

The discovery start and stop can throw the exception: "public class DiscoveryException: ApplicationException { ... }." In particular, the "DiscoveryEventHandler" is a callback handler for all discovery events (e.g., provider sends device discovery event to the host utilizing this event); "StartDiscovery" is the function to start the discovery of device; and "StopDiscovery" is the function to stop discovering new devices. Additionally, the above code utilizes device information object which includes information relating to the discovered RFID device.

The device discovery interface component 312 further includes a connection component 604 that facilitates connecting to a device. For example, the connection component 604 can utilize an XML string, such as "deviceIdXml", that encapsulates the information and/or data required to connect to the device. A schema can be employed by the connection component 604 that includes the following: a unique ID of a device, a provider name, a transport name, a standard transports, etc. For instance, the following schema can be utilized by the connection component 604:

```
<xsd:element name="deviceInformation" type="DeviceInformation" />
<xsd:complexType name="DeviceInformation">
    <xsd:sequence>
        <xsd:element name="id" type="xsd:string" />
        <xsd:element name="provider" type="xsd:string" />
        <xsd:element name="transport" type="xsd:string" />
        <xsd:element name="providerSpecific" type="xsd:anyType" />
    </xsd:sequence>
</xsd:complexType>
<xsd:simpleType name="Transport">
    <xsd:restriction base="xsd:string">
        <xsd:enumeration value="TCPIP"/>
        <xsd:enumeration value="SERIAL"/>
        <xsd:enumeration value="HTTP"/>
        <xsd:enumeration value="WIRELESS"/>
    </xsd:restriction>
</simpleType>
```

The device information class provides information about the RFID device. This class is provided by the provider at the time of discovery in the discovery event and from the device interface component 310 in FIG. 3.

Furthermore, a connection information class can be used for connection to an RFID device. For devices which support discovery, this object can be obtained from DeviceInformation object from the DiscoveryEvent. For devices that do not support discovery, this object can be manually filled before calling GetDevice( ) on ServiceProviderInterface object. The connection information class can be defined as follows:

```
public class ConnectionInformation
{
private string providerId;
private Transport transport;
private ITransportSettings transportSettings;
}
public enum Transport
{
TcpIP,
Serial,
Http,
Wireless
}
```

Figure 7:
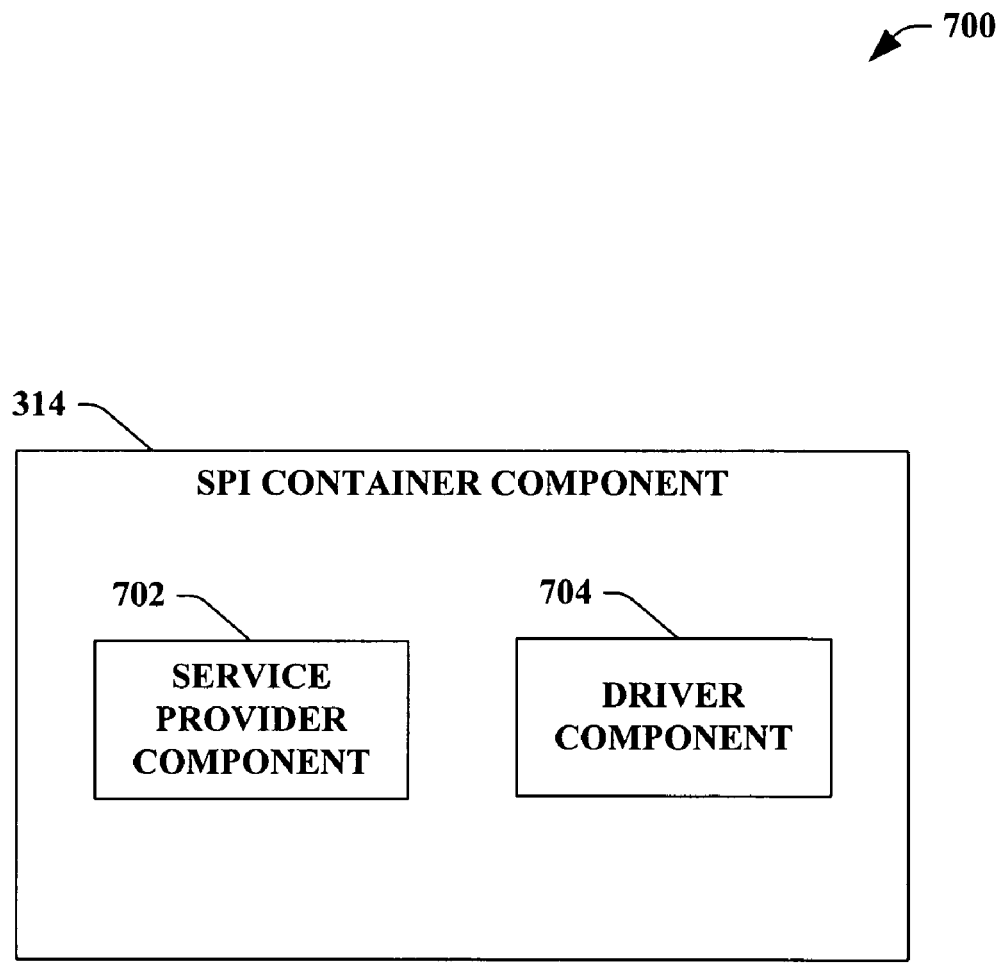
FIG. 7 illustrates a block diagram of an exemplary system that facilitates communicating with a device.

FIG. 7 illustrates a system 700 that facilitates interacting with a device to provide uniform techniques for communication and management. The SPI providers can be, for instance, assemblies that provide a multitude of advantages (e.g., .NET assemblies). It is to be appreciated the SPI container component 314 maintains driver state at a minimum. In other words, the amount of devices discovered and/or connected is unimportant to the SPI component 314.

The SPI container component 314 can include a service provider component 702 that can implement a service provider interface. The service provider interface is the entry point for the DSPI component (not shown). A DSPI implementer requires the interface in order to utilize an entry point. It is to be appreciated that methods in the interface can utilize the ProviderException. For example, the following code can be employed:

```
public abstract class ServiceProviderInterface : DeviceListenerInterface
{
    public abstract ProviderInformation ProviderInformation {get;};
    public abstract DataEncoding UserDataEncoding {get;}
    public abstract void Init(string hostId, string initXml);
    public abstract void ShutDown( );
    public abstract DeviceInterface GetDevice(ConnectionInformation deviceConnectionInfo);
    public abstract bool IsValidDevice(DeviceInformation deviceInfo);
    public abstract string[ ] GetPropertyGroupNames( );
    public abstract Hashtable GetPropertyMetadata(string propertyGroupName, string
        propertyName);
    public abstract PropertyProfile GetIdealReaderPropertyProfile( );
    public abstract PropertyProfile GetIdealWriterPropertyProfile( );
}
```

It is to be appreciated that a driver class supports the interface created above. Moreover, the "ProviderException" defined infra can be called. "ProviderInformation ProviderInformation {get;};" provides information about the DSPI provider, which can be utilized for information purposes by the DSPI host(s). A provider information class can be utilized to provide such information. For example, the following can be utilized to define the provider information class:

```
public class ProviderInformation
{
    private string id;
    private string description;
        private string version;
}
```

"Encoding UserDataEncoding {get;};" provides the encoding expected by the provider for user data (e.g., ASCII, Hex, . . . ). The function "void Init(string hosted, string initXml);" is the constructor of the provider. Host initializes the DSPI provider utilizing this method. "hostId" can be used for informational purposes by the provider, while "initXml" is provider specific XML (e.g., whose schema is specific to the provider), which can be utilized by the provider to initialize itself. The function "void Shutdown( )" can be used when devices are still connected, wherein the server is responsible for closing such connections. The function stops the discovery thread, cleans up state conditions, and/or resets the system. Thus, it is the destructor of the provider, and shuts down the provider. "DeviceListenerInterface GetDeviceListener( )" returns a reference to an object that supports, as cited in the code, DeviceInterface Listener interface (e.g., device interface component 310) that is utilized for discovery. Moreover, "DeviceInterface GetDevice(ConnectionInformation deviceConnectionInfo" implements ServiceProviderInterface interface to act as the factory for DeviceInterface interface. DeviceInterface interface abstracts an RFID device to which a host can communicate. It is also to be appreciated that the code "bool IsValidDevice(DeviceInformation deviceInfo);" provides a return of true if the device information represents a valid device supported by this device and is available for connection or connected already. "string[ ] GetPropertyGroupNames( );" returns names of property groups supported by this provider. A global property group with the name "String.Empty" is not returned by this method. The function "Hashtable GetpropertyMetadata(string propertyGroupName, string propertyName);" returns meta data about the properties as group name versus property meta data map. The return value can be defined by the following table:

|  | Property Name - NULL | Property Name - NON NULL |
| --- | --- | --- |
| Property Group Name - NULL | Meta data for all global properties - as empty string versus property meta data, | Meta data for named global property - as empty string versus property meta data; if this is not a global property return NULL |
| Property Group Name - NON-NULL | Meta data for all properties in this group as group name versus property meta data. | Meta data for named property in named group- as group name versus property meta data; if this is not a property belonging to this group, return NULL |

The function "PropertyProfile GetIdealReaderPropertyProfile( );" returns the optimal property profile for the RFID device which is in Reader role (e.g., which is in tag notification mode) for this provider. It contains the set of properties which when applied, results in the reader operating optimally. "PropertyProfile GetIdealWriterPropertyProfile( );" returns the optimal property for the RFID device which is in Writer role (e.g., synchronous commands mode) for this provider. It contains the set of properties which when applied, results in the writer operating optimally.

The SPI container component 314 can include a driver component 704 to facilitate registering at least one driver with a server. The driver component 704 provides the driver registration with the server in order to allow verified and authentic drivers. For instance, the driver registration can utilize digital signatures that enable secured and/or authentic drivers that ensure compatibility and functionality. For example, an IDriverManager interface can be implemented with the following code:

```
interface IDriverManager {
    string LoadDriver(string assemblyPath, string className);
    void UnloadDriver (string identifier);
    void StopReadersOfDriver(string identifier);
    string ListLoadedDrivers( );
}
```

The IDriverManager interface can be supported by, for instance, an RFID accelerator. Moreover, it is to be appreciated that a client can utilize a .NET platform to remotely connect and manage drivers. As stated supra, .NET platform provides a variety of advantages relating to the use of drivers and versatility. The code "string LoadDriver (AssemblyQualifiedNamespace);" can be implemented by the driver component 704. The path can be of an assembly located on a local machine, wherein the following exceptions can be thrown: assembly not found; version of driver in assembly not supported by the server; and identifier of assembly not unique (e.g., across the loaded drivers), wherein the identifier identifies a driver upon loading. It is to be appreciated that the "providerInstanceId" is returned upon the correct load of a driver. In addition, the driver component 704 can utilize the function "void UnloadDriver (string providerInstanceId);" that provides the removal of the driver from the server configuration. The driver corresponding to identifier not found is an exception that can be thrown in relation to the function.

Driver component 704 can implement the code, "string ListLoadedDrivers( );" that facilitates managing drivers. It is to be appreciated that the driver component 704 can provide management, wherein the string returned from the function "string ListLoadedDrivers( );" can be an XML string with the following format:

```
<xsd:element name="drivers" type="Drivers" />
<xsd:complexType name="Drivers">
    <xsd:sequence>
        <xsd:element name="driver" type="Driver" maxOccurs="unbounded" />
    </xsd:sequence>
</xsd:complexType>
<xsd:complexType name="Driver">
    <xsd:sequence>
        <xsd:element name="name" type="xsd:string" />
        <xsd:element name="assembly" type="xsd:string" />
        <xsd:element name="version" type="xsd:string" />
    </xsd:sequence>
</xsd:complexType>
```

The above code can create a complex type with the reference name, "Drivers." Furthermore, the code contains a driver name (e.g., providerInstanceId), a driver assembly name, and a driver version.

Figure 8:
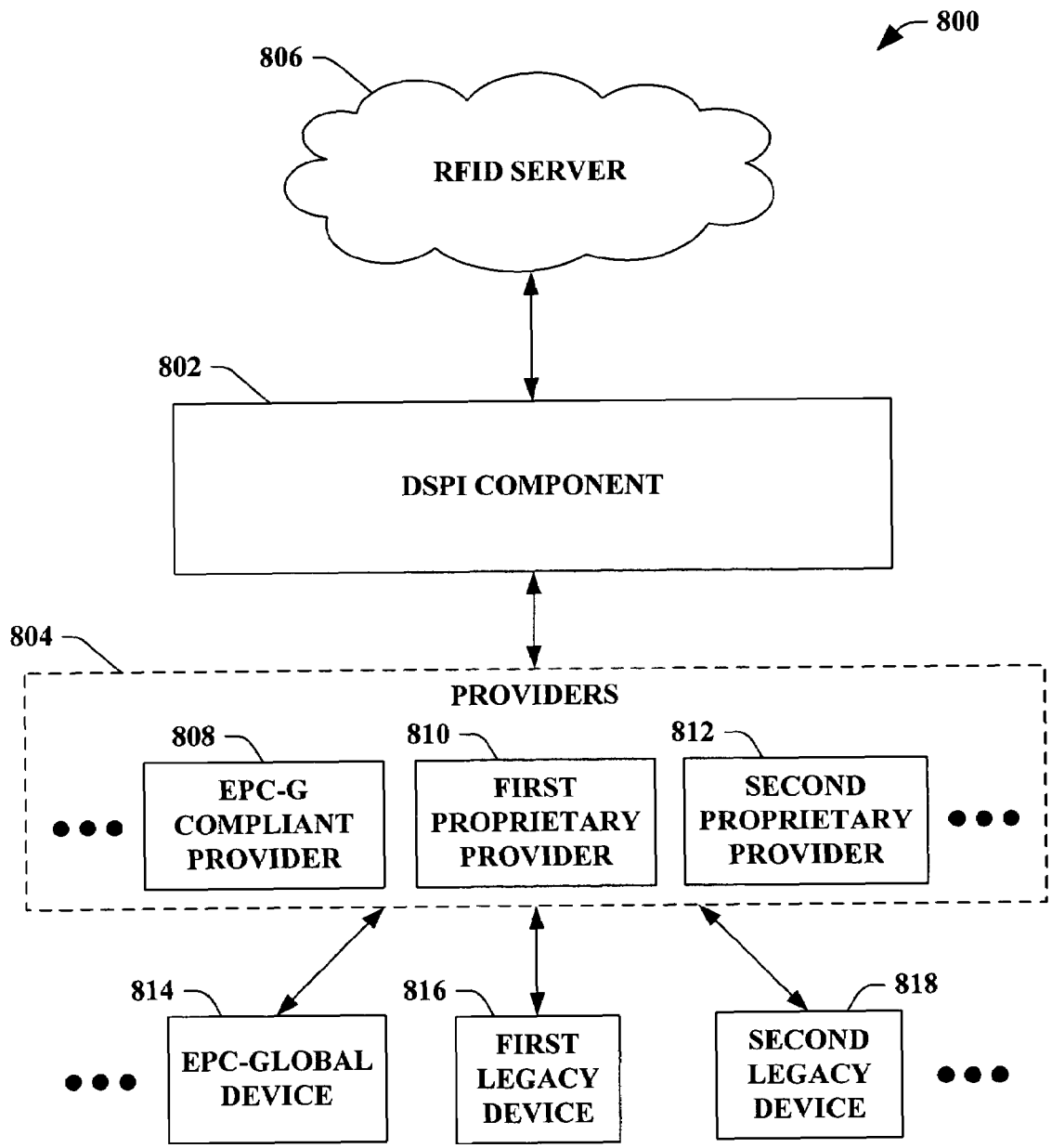
FIG. 8 illustrates a block diagram of an exemplary system that facilitates communicating with a plurality of devices and associated providers.

FIG. 8 illustrates a system 800 that facilitates utilizing a device service provider interface (DSPI) component 802 to provide uniform communication and management for a plurality of devices and associated providers. Providers 804 can include a plurality of providers such as an EPC-G compliant provider 808, a first proprietary provider 810, and a second proprietary provider 812. It is to be appreciated that the providers 804 enable service to an associated device. For instance, the EPC-G compliant provider 808 can be associated to an EPC-Global device 814, the first proprietary provider 810 can be associated to a first legacy device 816, and the second proprietary provider 812 can be associated to a second legacy device 818. It is to be appreciated that a DSPI component 802 interacts through one of the existing providers 804 for the associated device (e.g., the EPC-Global device 814, the first legacy device 816, and the second legacy device 818). The DSPI component 802 provides a uniform manner in which the providers 804 provide services to middleware products as each device supports a different set of commands. In other words, the DSPI component 802 defines interfaces for device vendors (e.g., and associated devices) to uniformly provide services to an RFID server 806.

It is to be appreciated that the DSPI component 802 can support in the message layer commands specific to at least one of the providers 804. The provider specific commands can be sent utilizing the following command object:

```
public class VendorDefined : Command
{
    private string vendor;
    private string command;
    private ParameterCollection parameters;
    private VendorDefinedResponse response;
}
public class VendorDefinedResponse : Response
{
    private string reply;
    private vendorData data;
}
```

The object above contains the provider specific command as a string. Additional parameters can be passed in the ParameterCollection. Reply to the command is sent as a reply string and any additional data is put in the data object. It is to be further appreciated that a provider specific notification can be sent utilizing the following event object:

```
public struct VendorDefinedEvent : IEvent
{
    private string id;
    private string vendor;
    private string name;
    private Data data;
}
```

This object contains an event id, vendor id, provider specific event name, and any provider specific data for the event.

In accordance with one aspect of the subject invention, the DSPI provider can implement a tag list functionality. A tag list stores the tags detected by the device (e.g., up to a buffer limit). The tag list eliminates duplicates utilizing DUPLICATE_ELIMINATION_TIME and stores them in the tag list. The tag list is utilized to store the detected tags at the device so that a host does not lose tags even if it is not connected to the provider. Tag list contains a collection of Tag entries, which is defined below:

```
public struct Tag
{
    private string tagId;
    private string tagData;
    private string tagType;
    private DateTime time;
    private string source;
    ...
}
```

Tag stores a tag Id, optional tag data, optional tag type, optional time, and optional source. Source is stored as simple provider specific string (e.g., Antenna1). It is to be appreciated that the source names can be, but are not limited to, Antenna1, Antenna2, and so on and so forth.

In accordance with another aspect of the subject invention, a bitmask filter can be applied to the tag ids of detected tags. Filter patterns can be implemented such as, for instance, utilizing zeros, ones, and x's, wherein an x represents a do not care. A filter is applied to the tag id of matching length only. In one example, filters are applied only to notifications. Synchronous commands do not apply these filters. A BitMaskReadFilter can be employed utilizing the following:

```
public class BitMaskReadFilter
{
    private string bitMask;
    private bool inclusive;
}
```

In accordance with yet another aspect of the subject invention, at least one of the providers 804 can provide a set of tag commands which support a pass code. If a user sets the pass code utilizing the "WriteID" command, it will be applicable to all these secure operations. If the user had no pass code, all these will become normal commands. Pass codes will be specific to a tag.

Figure 9:
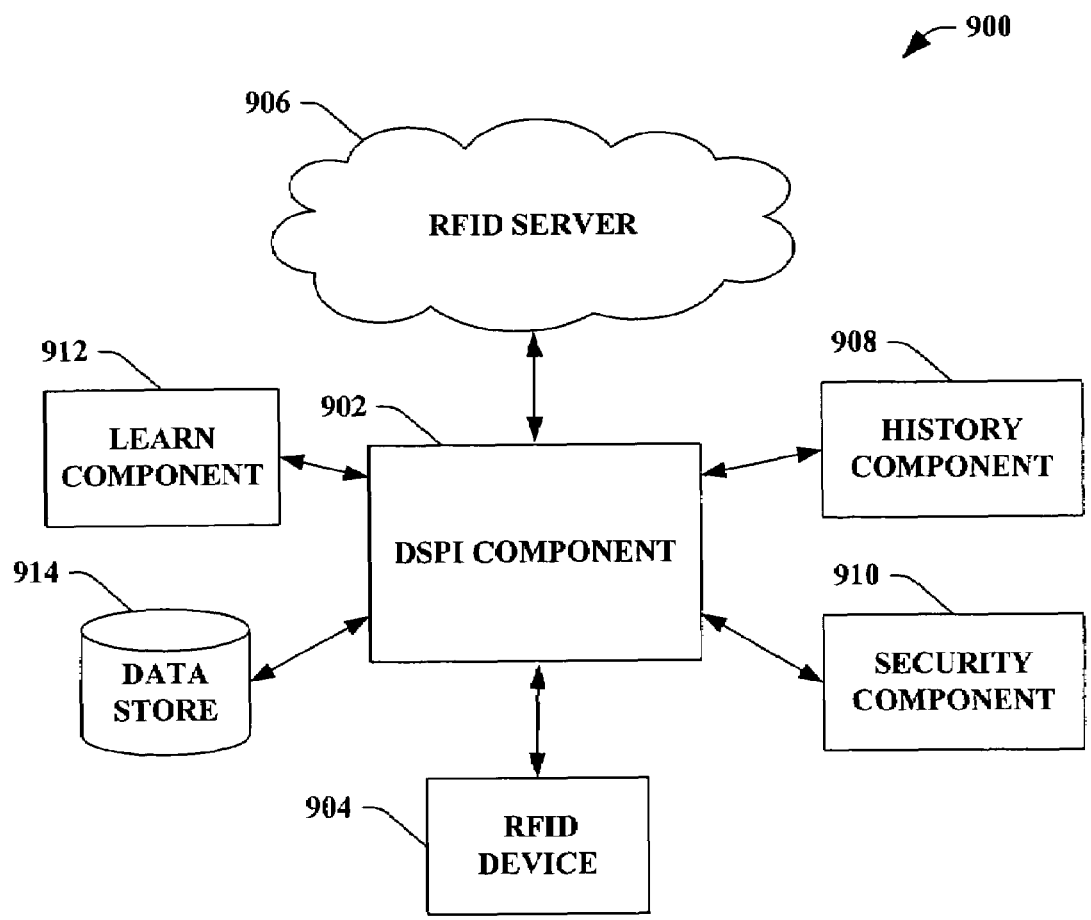
FIG. 9 illustrates a block diagram of an exemplary system that facilitates interacting with a device.

FIG. 9 illustrates a system 900 that facilitates utilizing a device service provider interface (DSPI) component 902 to provide uniform communication and/or management for a device. The DSPI component 902 facilitates communicating between an RFID server 906 and an RFID device 904 by providing uniform techniques for communication and management. For instance, a provider (not shown) associated to at least one RFID device 904 can implement the DSPI component 902. The provider can be a processor independent platform assembly that implements the interface(s) defined by the DSPI component 902.

The DSPI component 902 can utilize a history component 908 that provides a log of activity based at least upon the DSPI component 902, the RFID server 906, and/or the RFID device 904. The history component can track and/or log information such as, for instance, provider lists, devices associated to providers, connection history, connection data, signal data, authentication data, etc. Furthermore, it is to be appreciated that the activity log created by the history component 908 can be real-time data stream and/or stored data. The history component 908 can utilize a data store 914 to store such log activity and/or historic data. Such data store 914 is described in detail infra.

The DSPI component 902 can interact with a security component 910 to provide additional security to the system 900. The security component 910 can allow authentication (e.g., login and/or password), verification (e.g., verifying such login and password), secured connection (e.g., based at least upon verification), security levels (e.g., based on a user name and/or password), encryption, etc. For example, the security component 910 can provide a secure connection, wherein information can be exchanged that allows providers to interact with and/or utilize interfaces defined by the DSPI component 902. Furthermore, the authentication and/or verification of the system 900 can increase the confidence of users regarding the drivers provided.

In accordance with one aspect of the subject invention, the DSPI component 902 can utilize a learn component 912 to facilitate establishing communication between the RFID server 906 and the RFID device 904. The learn component 912 can utilize machine learning (e.g., artificial intelligence) techniques in order to determine, for example, provider activity/behavior, device activity/behavior, security trends, etc. The learn component 912 can analyze the information associated to the history component 908 such as, for instance, historic data and/or activity logs to determine whether a provider can implement an interface defined by the DSPI component 902. Furthermore, in determining whether a particular device is to be connected and/or serviced, the learn component 912 can analyze characteristics and/or behavior patterns determined based at least in part upon artificial intelligence techniques.

It is to be appreciated that the history component 908, the security component 910, and/or the learn component 912 can utilize the data store 914 in order to store data. The data store 914 can be located within the DSPI component 902 and/or on a remote server. Furthermore, the data store 914 can be, for example, either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable programmable ROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM). The data store 914 of the subject systems and methods is intended to comprise, without being limited to, these and any other suitable types of memory.

Figure 10:
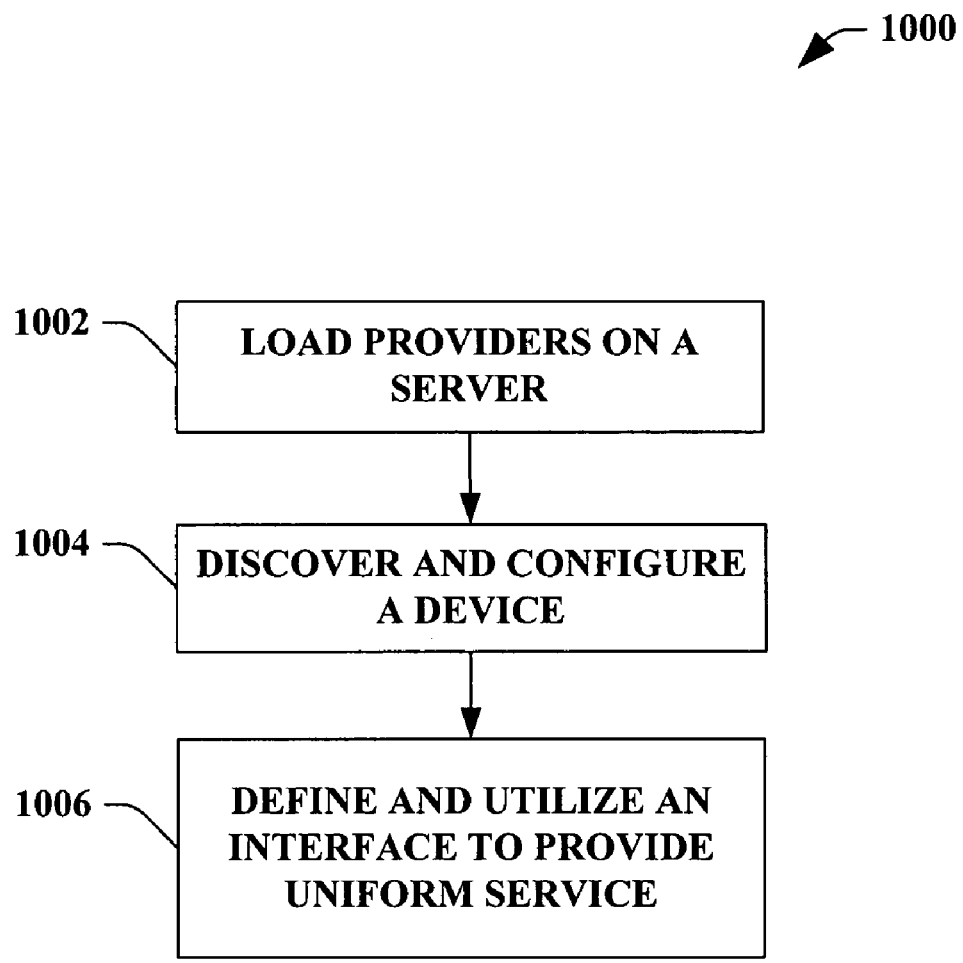
FIG. 10 illustrates a flow chart of an exemplary methodology that facilitates providing uniform services for a device.
Figure 11:
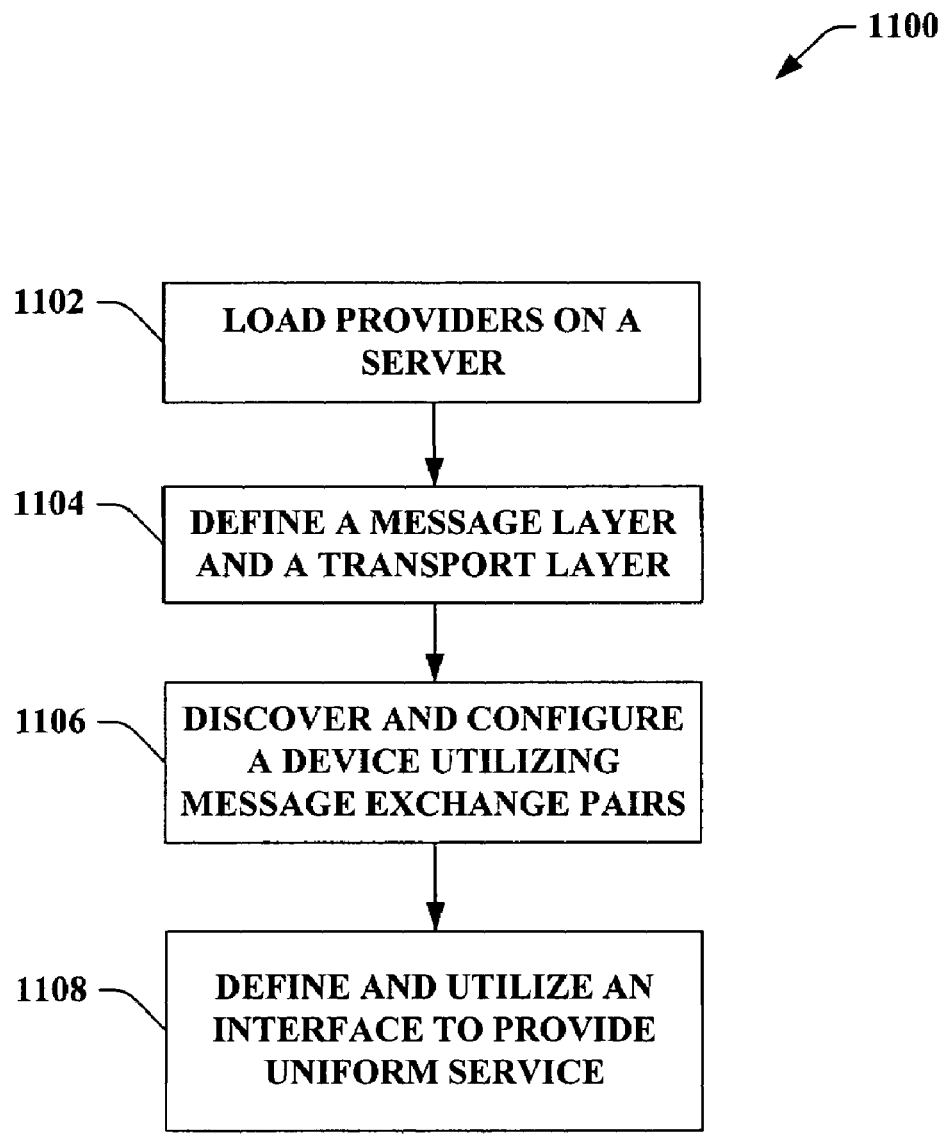
FIG. 11 illustrates a flow chart of an exemplary methodology that facilitates providing uniform services for a device.
Figure 12:
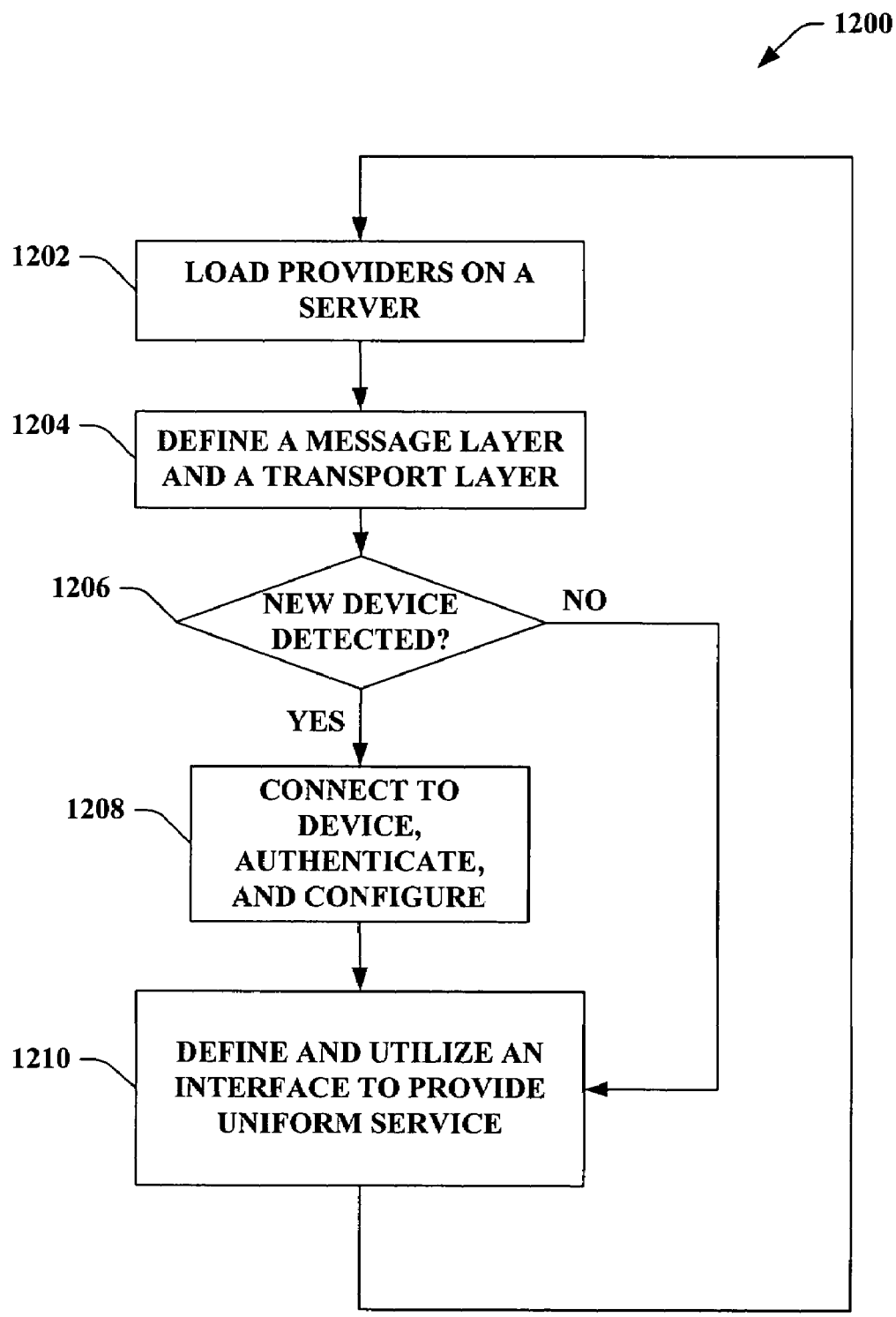
FIG. 12 illustrates a flow chart of an exemplary methodology that facilitates providing uniform services for a device.

FIGS. 10-12 illustrate methodologies in accordance with the subject invention. For simplicity of explanation, the methodologies are depicted and described as a series of acts. It is to be understood and appreciated that the subject invention is not limited by the acts illustrated and/or by the order of acts, for example acts can occur in various orders and/or concurrently, and with other acts not presented and described herein. Furthermore, not all illustrated acts may be required to implement the methodologies in accordance with the subject invention. In addition, those skilled in the art will understand and appreciate that the methodologies could alternatively be represented as a series of interrelated states via a state diagram or events.

FIG. 10 illustrates a methodology 1000 that facilitates communicating with a device by utilizing a uniform technique for interaction. At 1002, providers can be loaded on a server. In particular, an SPI container can load the provider(s) onto an RFID server. Upon loading the provider(s) onto a server, the version of the SPI can be verified to be compatible with such server. Furthermore, the driver(s) can be registered with the RFID server in order to provide compatible driver(s) (e.g., digital verification).

At 1004, a device is discovered and configured. The discovery is efficient such that one component is instantiated per a provider and the devices can be utilized. Furthermore, the provider handles the discovery thread errors during the discovery process. After discovery of a device, a string can provide information required to connect and/or configure the device. For instance, the string can be in markup language format (e.g., an extensible markup language (XML), a hypertext markup language (HTML), a standard generalized markup language (SGML), and an extensible hypertext markup language (XHTML), . . . ) having information such as, but is not limited to, a unique id of the device, a provider name, a transport name, etc.

Next at 1006, an interface can be defined and utilized in order to provide a uniform service to the device. Once a provider is loaded on the RFID server, and a device is discovered and/or configured, the interface(s) can be utilized by a provider in order to communicate with uniform techniques. The defined interfaces can provide discovery and configuration for new devices; and further communication can connection management for all devices (e.g., new and established). By utilizing uniform technique(s), normalization is provided across a multitude of standards.

FIG. 11 illustrates a methodology 1100 that facilitates communicating with a device. At 1102, a provider is loaded onto an RFID server. Once authenticated, the provider is loaded, wherein a plurality of services can be provided uniformly by utilizing at least one interface. At 1104, a message layer and/or a transport layer are defined. Messaging and/or connection managing is provided within the message layer and/or the transport layer. For instance, a send channel can utilize "SendMessage( )" to send message exchanges. Additionally, a first receive channel for responses can implement "CmdResponseEvent," while a second receive channel for notifications can utilize "NotificationEvent." The connection management can be provided utilizing an XML string. It is to be appreciated the provider can maintain a connection to a device until the connection is closed with the function "Close( )."

At 1106, device(s) can be discovered and configured by utilizing the message layer and/or transport layer. The discovery and configuration of the device(s) is done with message exchange pairs. The message exchange pairs are exchanged between the server and the device. It is to be appreciated that the message exchange pairs are asynchronous and can be matched utilizing a message identification. As stated supra, the "SendMessage( )" can be used to send requests to a device, while replies and notifications are received with "CmdResponseEvent" and "NotificationEvent" respectively. Furthermore, the message exchange pairs can utilize properties to configure the device(s). It is to be appreciated that standard properties can also be defined and implemented by the configuration and/or discovery process.

Next at 1108, an interface is defined and utilized to provide uniform service via the RFID server to the discovered and configured devices. Message exchange pairs can provide uniform techniques to communicate with existing and/or newly detected devices. It is to be appreciated that numerous interfaces can be defined for discovery, configuration, communication, and connection management. In general, the method 1100 can provide an abstraction layer to communicate with and to manage devices uniformly.

FIG. 12 illustrates a methodology 1200 that provides a uniform technique to communicate and/or manage a device. At 1202, RFID providers are loaded onto an RFID server in order to provide services. It is to be appreciated that new providers are detected and loaded accordingly upon authentication and/or verification. At 1204, a message layer and a transport layer are defined providing communication capabilities from a device service provider interface (DSPI) component and an RFID device. At 1206, a determination is made whether a new device is detected. If a new device is detected, the process proceeds to 1208, where the device is connected, authenticated, and configured accordingly. If a new device is not detected, the process continues to 1210, where interfaces can be defined and utilized to provide uniform services to the detected (e.g., discovered, verified, and/or authenticated) RFID devices.

It is to be appreciated that the process 1200 provides a continuous polling and/or a period determination on whether a new provider and/or new associated devices are present within the RFID server. In other words, while providing the uniform service to the detected devices, the process can proceed to 1202 upon the detection of a new provider, wherein the provider can be loaded and associated devices can be discovered, connected, and authenticated. Furthermore, it is to be appreciated that a new device can be established on a pre-existing provider. Thus, the process can discover and configure such a new device accordingly. A substantially continuous polling and/or a periodic check can employ the determination of new devices and/or providers.

Figure 13:
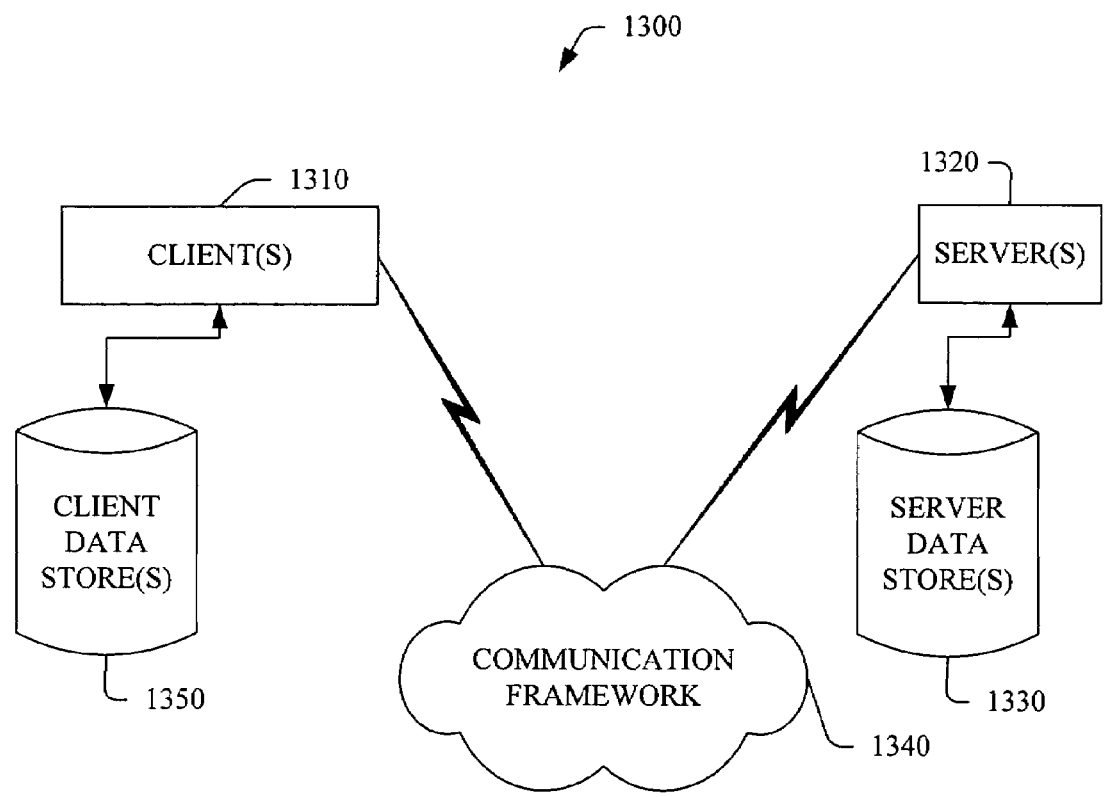
FIG. 13 illustrates an exemplary networking environment, wherein the novel aspects of the subject invention can be employed.
Figure 14:
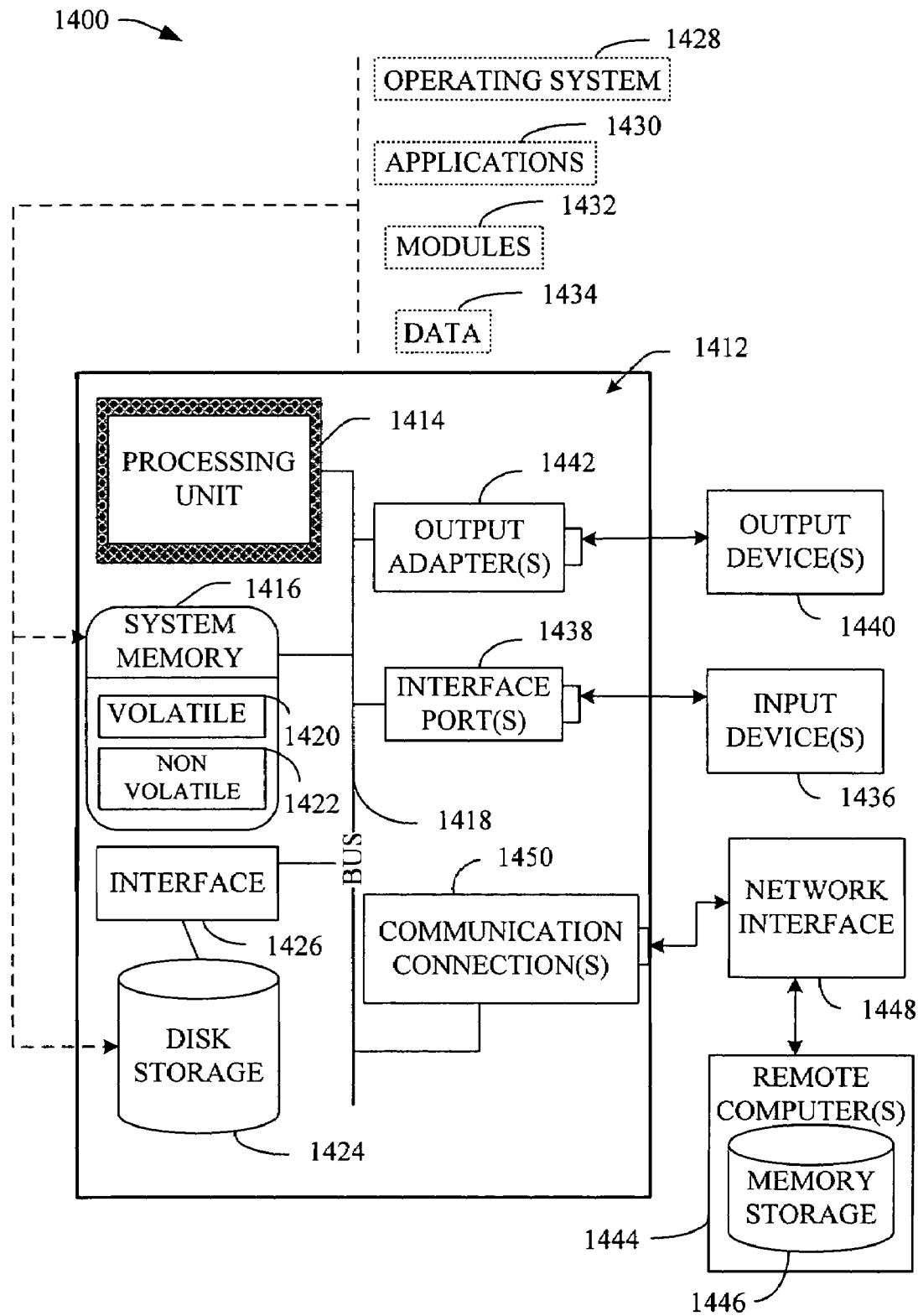
FIG. 14 illustrates an exemplary operating environment, wherein the novel aspects of the subject invention can be employed.

In order to provide additional context for implementing various aspects of the subject invention, FIGS. 13-14 and the following discussion is intended to provide a brief, general description of a suitable computing environment in which the various aspects of the subject invention may be implemented. While the invention has been described above in the general context of computer-executable instructions of a computer program that runs on a local computer and/or remote computer, those skilled in the art will recognize that the invention also may be implemented in combination with other program modules. Generally, program modules include routines, programs, components, data structures, etc., that perform particular tasks and/or implement particular abstract data types.

Moreover, those skilled in the art will appreciate that the inventive methods may be practiced with other computer system configurations, including single-processor or multi-processor computer systems, minicomputers, mainframe computers, as well as personal computers, hand-held computing devices, microprocessor-based and/or programmable consumer electronics, and the like, each of which may operatively communicate with one or more associated devices. The illustrated aspects of the invention may also be practiced in distributed computing environments where certain tasks are performed by remote processing devices that are linked through a communications network. However, some, if not all, aspects of the invention may be practiced on stand-alone computers. In a distributed computing environment, program modules may be located in local and/or remote memory storage devices.

FIG. 13 is a schematic block diagram of a sample-computing environment 1300 with which the subject invention can interact. The system 1300 includes one or more client(s) 1310. The client(s) 1310 can be hardware and/or software (e.g., threads, processes, computing devices). The system 1300 also includes one or more server(s) 1320. The server(s)

1320 can be hardware and/or software (e.g., threads, processes, computing devices). The servers 1320 can house threads to perform transformations by employing the subject invention, for example.

One possible communication between a client 1310 and a server 1320 can be in the form of a data packet adapted to be transmitted between two or more computer processes. The system 1300 includes a communication framework 1340 that can be employed to facilitate communications between the client(s) 1310 and the server(s) 1320. The client(s) 1310 are operably connected to one or more client data store(s) 1350 that can be employed to store information local to the client(s) 1310. Similarly, the server(s) 1320 are operably connected to one or more server data store(s) 1330 that can be employed to store information local to the servers 1340.

With reference to FIG. 14, an exemplary environment 1400 for implementing various aspects of the invention includes a computer 1412. The computer 1412 includes a processing unit 1414, a system memory 1416, and a system bus 1418. The system bus 1418 couples system components including, but is not limited to, the system memory 1416 to the processing unit 1414. The processing unit 1414 can be any of various available processors. Dual microprocessors and other multiprocessor architectures also can be employed as the processing unit 1414.

The system bus 1418 can be any of several types of bus structure(s) including the memory bus or memory controller, a peripheral bus or external bus, and/or a local bus using any variety of available bus architectures including, but are not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1394), and Small Computer Systems Interface (SCSI).

The system memory 1416 includes volatile memory 1420 and nonvolatile memory 1422. The basic input/output system (BIOS), containing the basic routines to transfer information between elements within the computer 1412, such as during start-up, is stored in nonvolatile memory 1422. By way of illustration, and not limitation, nonvolatile memory 1422 can include read only memory (ROM), programmable ROM (PROM), electrically programmable ROM (EPROM), electrically erasable programmable ROM (EEPROM), or flash memory. Volatile memory 1420 includes random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1412 also includes removable/non-removable, volatile/nonvolatile computer storage media. FIG. 14 illustrates, for example a disk storage 1424. Disk storage 1424 includes, but is not limited to, devices like a magnetic disk drive, floppy disk drive, tape drive, Jaz drive, Zip drive, LS-100 drive, flash memory card, or memory stick. In addition, disk storage 1424 can include storage media separately or in combination with other storage media including, but is not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1424 to the system bus 1418, a removable or non-removable interface is typically used such as interface 1426.

It is to be appreciated that FIG. 14 describes software that acts as an intermediary between users and the basic computer resources described in the suitable operating environment 1400. Such software includes an operating system 1428. Operating system 1428, which can be stored on disk storage 1424, acts to control and allocate resources of the computer system 1412. System applications 1430 take advantage of the management of resources by operating system 1428 through program modules 1432 and program data 1434 stored either in system memory 1416 or on disk storage 1424. It is to be appreciated that the subject invention can be implemented with various operating systems or combinations of operating systems.

A user enters commands or information into the computer 1412 through input device(s) 1436. Input devices 1436 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1414 through the system bus 1418 via interface port(s) 1438. Interface port(s) 1438 include, for example, a serial port, a parallel port, a game port, and a universal serial bus (USB). Output device(s) 1440 use some of the same type of ports as input device(s) 1436. Thus, for example, a USB port may be used to provide input to computer 1412, and to output information from computer 1412 to an output device 1440. Output adapter 1442 is provided to illustrate that there are some output devices 1440 like monitors, speakers, and printers, among other output devices 1440, which require special adapters. The output adapters 1442 include, by way of illustration and not limitation, video and sound cards that provide a means of connection between the output device 1440 and the system bus 1418. It should be noted that other devices and/or systems of devices provide both input and output capabilities such as remote computer(s) 1444.

Computer 1412 can operate in a networked environment using logical connections to one or more remote computers, such as remote computer(s) 1444. The remote computer(s) 1444 can be a personal computer, a server, a router, a network PC, a workstation, a microprocessor based appliance, a peer device or other common network node and the like, and typically includes many or all of the elements described relative to computer 1412. For purposes of brevity, only a memory storage device 1446 is illustrated with remote computer(s) 1444. Remote computer(s) 1444 is logically connected to computer 1412 through a network interface 1448 and then physically connected via communication connection 1450. Network interface 1448 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1450 refers to the hardware/software employed to connect the network interface 1448 to the bus 1418. While communication connection 1450 is shown for illustrative clarity inside computer 1412, it can also be external to computer 1412. The hardware/software necessary for connection to the network interface 1448 includes, for exemplary purposes only, internal and external technologies such as, modems including regular telephone grade modems, cable modems and DSL modems, ISDN adapters, and Ethernet cards.

What has been described above includes examples of the subject invention. It is, of course, not possible to describe every conceivable combination of components or methodologies for purposes of describing the subject invention, but one of ordinary skill in the art may recognize that many further combinations and permutations of the subject invention are possible. Accordingly, the subject invention is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the invention. In this regard, it will also be recognized that the invention includes a system as well as a computer-readable medium having computer-executable instructions for performing the acts and/or events of the various methods of the invention.

In addition, while a particular feature of the invention may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates interacting with a device, the system comprising a processor and one or more physical computer readable storage media operatively coupled to the processor, the computer readable storage media having stored thereon computer executable instructions that, when executed by the processor, implement the following:
   a receiver component that receives a protocol translation that relates to a device having an associated provider;
   a device service provider interface (DSPI) component that defines an interface to uniformly communicate to the device and to expose functionality of the device regardless of a device vendor and the protocol standard, wherein the associated provider implements the interface to expose the functionality of the device by utilizing a device command which abstracts a device specific detail and is a processor independent platform assembly; and
   a request response component that defines a message exchange that is a command and a response object.

2. The system of claim 1, the device vendor is a third-party vendor that utilizes the DSPI component.

3. The system of claim 1, wherein the command and the response are asynchronous and matched utilizing a message ID.

4. The system of claim 3, the message exchange is a request response pair being at least one of the following: a command; a property; and a notification.

5. The system of claim 1, the device is at least one of the following: a radio frequency identification (RFID) device, a real-time sensor, a sensor, a device extensible to a web service, and a real-time event generation system.

6. The system of claim 1, the DSPI component separates a logical event source and a physical event source, wherein there is one instantiation and such instantiation is utilized to work with the device regardless of at least one of the following: a location, a type, the device vender, the protocol standard.

7. The system of claim 1, further comprising a device interface component that defines a layer, wherein the layer is one of: a message layer; and a transport layer.

8. The system of claim 1, further comprising a device discovery interface component that defines an device discovery mechanism utilizing a markup language defined string encapsulating device connection data, wherein the device discovery mechanism instantiates one DSPI component per provider.

9. The system of claim 1, further comprising an SPI container component that loads a DSPI provider, wherein the SPI container component provides one of the following: a compatible SPI version; a digital authentication of a driver; and a driver registration.

10. The system of claim 1, the DSPI component utilizes a security component that provides one of the following: a secure connection; an authentication of a provider; and a verification of the device.

11. A method implemented within a computing system that includes a processor and memory storing instructions which, when executed by the processor, implement the method that facilitates interacting with a device, the method comprising:
   receiving a protocol translation that relates to a device having an associated provider; and
   defining an interface to uniformly communicate to the device and to expose functionality of the device regardless of a device vendor and the protocol standard, wherein the associated provider implements the interface to expose the functionality of the device by utilizing a device command which abstracts a device specific detail and is a processor independent platform assembly.

12. A computer readable storage medium having stored thereon computer executable instructions that, when executed by a processor, perform the method of claim 11.

13. The method of claim 11, further comprising:
   loading a provider into an RFID server;
   defining a message layer and a transport layer; and
   discovering and configuring the device.

14. The method of claim 11, further comprising a message exchange pair that is asynchronous.

15. The method of claim 14, the message exchange pair is one of the following: a request and a response; a request and a reply; a request and a notification; and a request and a property.

16. The method of claim 11, further comprising separating a logical event source and a physical event source.

17. The method of claim 11, further comprising extending the interface to at least one of a third party device vendor, a web service, and a real-time sensor device.

18. A data packet that communicates between a receiver component and the interface, the data packet facilitates the method of claim 11.

19. A computer readable storage medium having stored thereon computer executable instructions that, when executed by a processor, perform a method that facilitates interacting with a RFID device, the method comprising:
   receiving a protocol translation that relates to a RFID device;

defining a device service provider interface (DSPI) to uniformly communicate to the RFID device and to expose functionality of the RFID device regardless of a device vendor and the protocol standard;
loading a RFID provider into an RFID server;
defining a message layer and a transport layer that provide communication capabilities from the RFID device to the DSPI; and
discovering and configuring the device.

20. The computer readable storage medium of claim 19, wherein the RFID device is associated with the RFID provider, and wherein the associated RFID provider implements the DSPI to expose the functionality of the RFID device by utilizing a device command which abstracts a device specific detail and is a processor independent platform assembly.

* * * * *